(12) United States Patent
Izuhara

(10) Patent No.: US 8,737,795 B2
(45) Date of Patent: May 27, 2014

(54) OPTICAL FIBER HOLDER, OPTICAL DEVICE USING THE SAME, AND METHOD FOR STOWING SURPLUS LENGTH OF OPTICAL FIBER

(75) Inventor: Noboru Izuhara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 212 days.

(21) Appl. No.: 13/349,695

(22) Filed: Jan. 13, 2012

(65) Prior Publication Data
US 2012/0230643 A1 Sep. 13, 2012

(30) Foreign Application Priority Data

Mar. 8, 2011 (JP) ................................ 2011-050826

(51) Int. Cl.
*G02B 6/00* (2006.01)
(52) U.S. Cl.
USPC ........................................................ 385/135
(58) Field of Classification Search
USPC ........................................................ 385/135
See application file for complete search history.

(56) References Cited

U.S. PATENT DOCUMENTS

| | | | | |
|---|---|---|---|---|
| 7,613,377 | B2 * | 11/2009 | Gonzales et al. | 385/135 |
| 7,822,310 | B2 * | 10/2010 | Castonguay et al. | 385/135 |
| 7,936,960 | B2 * | 5/2011 | McGranahan | 385/135 |
| 2003/0091314 | A1 | 5/2003 | Sudo et al. | |

FOREIGN PATENT DOCUMENTS

| | | |
|---|---|---|
| JP | 61-116302 A | 6/1986 |
| JP | 2003-156634 A | 5/2003 |

* cited by examiner

*Primary Examiner* — Sung Pak
(74) *Attorney, Agent, or Firm* — Fujitsu Patent Center

(57) ABSTRACT

An optical fiber holder includes a pair of first optical fiber guides, each of the first optical fiber guides satisfying a condition of an allowable bend radius of an optical fiber; a second optical fiber guide configured to hold a joined portion of the optical fiber at a position between the first optical fiber guides, the second optical fiber guide satisfying the condition of the allowable bend radius of the optical fiber; and a tray to hold the first optical fiber guides and the second optical fiber guide, the tray having a fiber extraction opening for pulling the optical fiber onto the tray. A distance from the fiber extraction opening to a fixing position of the second optical fiber guide on the tray is set smaller than a distance from the fiber extraction opening to a fixing position of the first optical fiber guides on the tray.

16 Claims, 29 Drawing Sheets

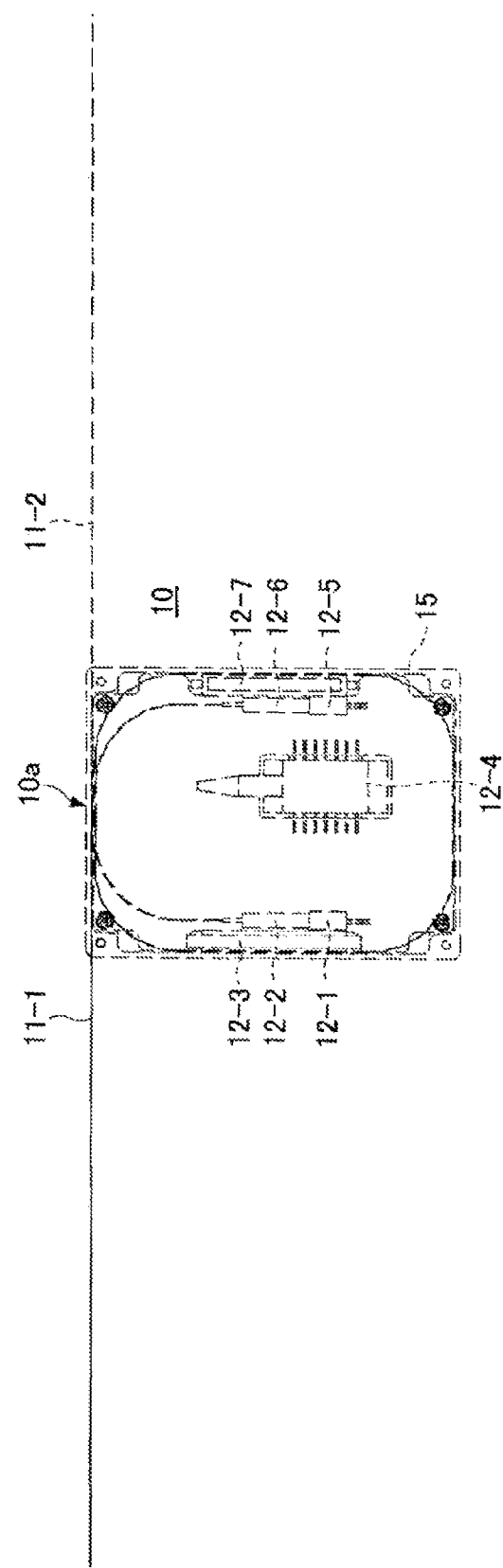

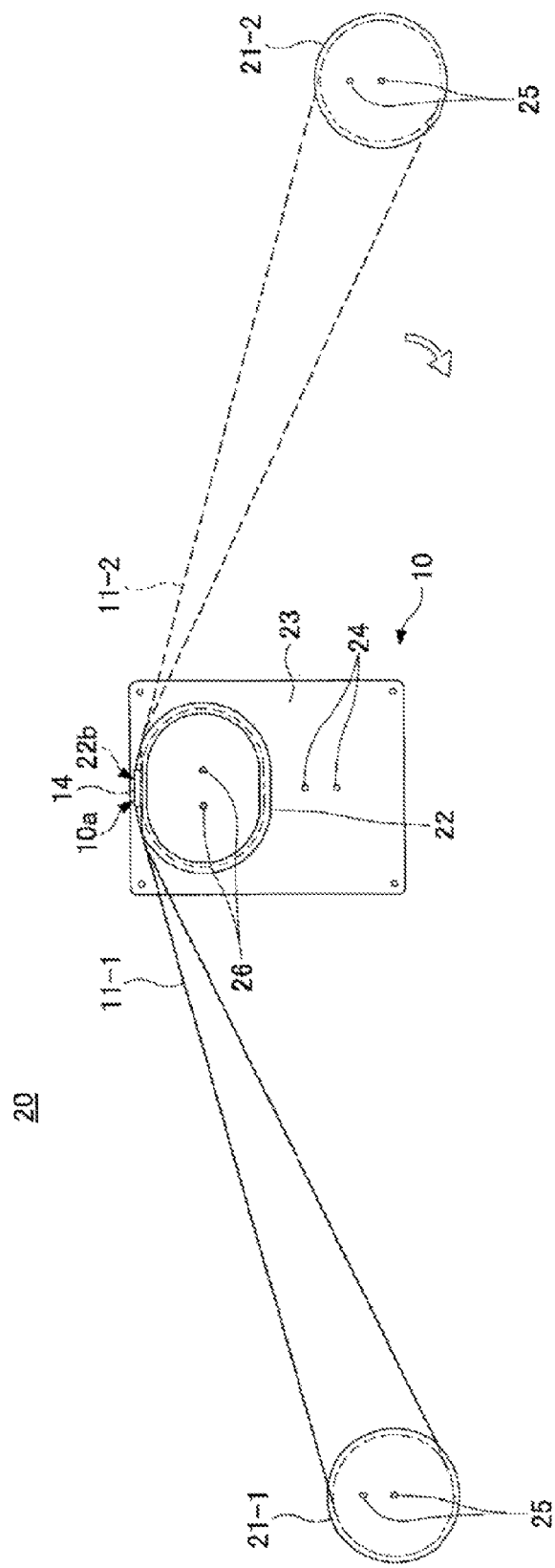

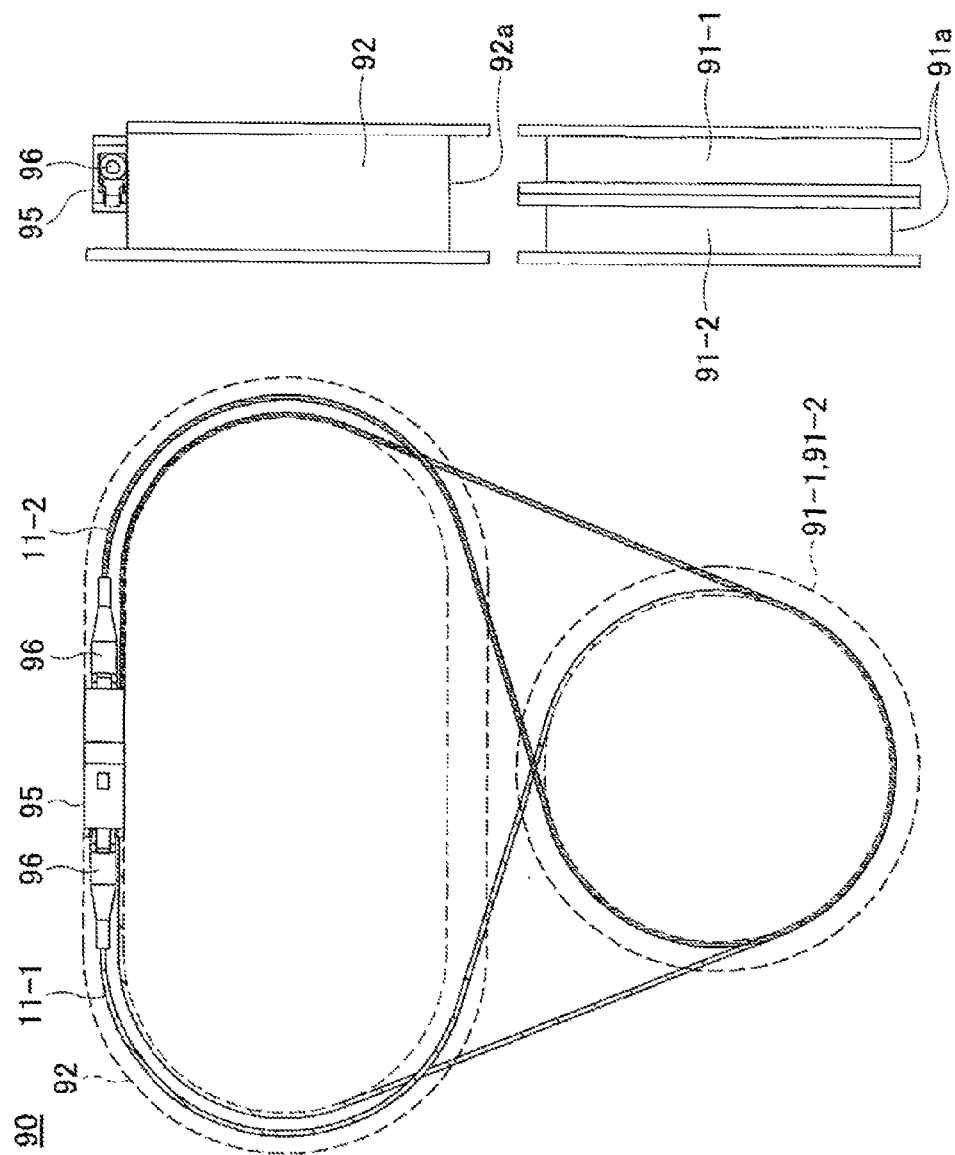

OPTICAL FIBER HOLDER, OPTICAL DEVICE USING THE SAME, AND METHOD FOR STOWING SURPLUS LENGTH OF OPTICAL FIBER

CROSS REFERENCE TO RELATED APPLICATIONS

This application is based upon and claims the benefit of priority of the prior Japanese Patent Application No. 2011-050826 filed on Mar. 8, 2011, the entire contents of which are incorporated herein by references.

FIELD

The embodiments discussed herein relate to an optical fiber holder, an optical device using the same, and a method for stowing a surplus length of an optical fiber.

BACKGROUND

Optical circuit devices are made workable generally by connecting a number of optical components via optical fibers. To operate an optical amplifier, for example, thirty or more optical fibers are joined to one another to connect optical components. There are some known techniques for joining optical fibers. One method is using optical fiber cable with a connector, which connector is to be connected to a counterpart connector via an optical adaptor. Another method is splicing optical fibers. To join a number of optical fibers all together, the latter method is generally employed because it is advantageous from the viewpoints of durability against loss of optical signals and stowing efficiency. In general, the more the optical fibers to be connected, the greater the signal loss and the required stowing space.

FIG. 1A through FIG. 1E illustrate a conventional method for splicing optical fibers using a fiber fusion splicer. In FIG. 1A, optical fibers 102-1 and 102-2, which are used to connect optical components inside an optical circuit device 101, are pulled out from an opening 101a of the optical circuit device 101 such that the optical fibers 102-1 and 102-2 can be placed on a splicer (not shown). Then, in FIG. 1B, the ends of the optical fibers 102-1 and 102-2 are spliced by the splicer. The spliced part is reinforced by a protection sleeve 104. By this splicing process, optical components (not shown) arranged in the optical circuit device 101 are connected to each other via the optical fibers 102-1 and 102-2. The spliced optical fibers 102-1 and 102-2 involve a surplus length produced for the purpose of fiber fusion splicing using the splicer. The surplus length of the spliced optical fibers 102 is stowed in the optical circuit device 101. This process is called a "surplus length stowing process".

As illustrated in FIG. 1C, the looped optical fibers 102-1 and 102-2 (which are collectively referred to as "optical fibers 102") are twisted in figure eight (8). Then, the twisted optical fibers 102 are folded onto the optical circuit device 101 as illustrated in FIG. 1D, and further folded at the twisted portion as illustrated in FIG. 1E such that the entirety of the surplus length of joined optical fibers is accommodated in the case of the optical circuit device 101.

The acceptable bend radius of the optical fibers 102 is confined to prevent degradation of optical signals propagating through the optical fibers 102. Microbending deformation due to twisting of optical fibers will cause degradation of optical signals. Since it is difficult to visually determine at which point microbending exists, it is hard to specify and repair the portion at which optical signal loss has occurred due to the microbending. Accordingly, it is preferred not to twist the optical fibers during the surplus length stowing process.

Although in FIG. 1A through 1E each of the optical fibers 102-1 and 102-2 pulled out from the opening 101a is depicted in a single line for the purpose of simplification, a set of optical fibers (e.g., ten optical fibers) are pulled out from each side of the opening 101a of the optical circuit device 101 in the actual process. A set of optical fibers are arranged in parallel and joined end-to-end to the counterpart set of optical fibers by fusion splicing. The collectively spliced optical fibers are twisted or folded during the surplus length stowing process, and each one of the optical fibers has to be treated very carefully. Accordingly, the stowing work becomes complicated with increased workload. In addition, if the surplus length stowing process is carried out by hand, the handiwork varies depending on the workers.

A known technique for stowing the surplus length of optical fibers is bundling the surplus lengths and tucking the bundle between surplus length stowing sheets. (See, for example, Japanese Laid-Open Patent Publication No. 61-116302). Another known method is winding the surplus lengths of optical fibers and fixing the winding in an annular groove. (See, for example, Japanese Laid-Open Patent Publication No. 2003-156634).

In view of these problems, there is a demand for an optical fiber holder that can hold a set of optical fibers in good order without twisting, while satisfying the allowable (minimum) bend radius. There are also demands for an optical device using the optical fiber holder and a surplus length stowing method for optical fibers.

SUMMARY

According to one aspect of the present disclosure, an optical fiber holder includes:

a pair of first optical fiber guides, each satisfying a condition of an allowable bend radius of an optical fiber;

a second optical fiber guide configured to hold a joined portion of the optical fiber at a position between the first optical fiber guides, the second optical fiber guide satisfying the condition of the allowable bend radius of the optical fiber; and a tray configured to hold the first optical fiber guides and the second optical fiber guide, the tray having a fiber extraction opening for pulling the optical fiber onto the tray, wherein a distance from the fiber extraction opening to a fixing position of the second optical fiber guide on the tray is set smaller than a distance from the fiber extraction opening to a fixing position of the first optical fiber guides on the tray.

According to another aspect of the present disclosure, a method of stowing a surplus length of an optical fiber is provided. The method includes:

joining at least two optical fibers pulled out from an optical circuit device;

holding the joined optical fibers between a pair of first optical fiber guides arranged one guide on either side of the joint of the optical fibers, each of the first optical fiber guides satisfying an allowable bend radius of the optical fibers;

holding the joint of the optical fibers with a second optical fiber guide that satisfies the allowable bend radius of the optical fiber;

moving the second optical fiber guide straight toward a first fixing position on the optical circuit device, while holding the joint of the optical fibers with the second optical fiber guide, to secure the second optical fiber guide onto the optical circuit device at the first fixing position; and moving each of the first optical fiber guides, while holing the joined optical fibers between the first optical fiber guides, around the second optical fiber guide fixed at the first fixing position to take up the optical fibers and secure the first optical fiber guides onto the optical circuit device at a second fixing position.

The object and advantages of the invention will be realized and attained by means of the elements and combinations particularly pointed out in the claims.

It is to be understood that both the foregoing general description and the following detailed description are exemplary and explanatory and are not restrictive to the invention as claimed.

BRIEF DESCRIPTION OF DRAWINGS

FIG. 2 illustrates an optical circuit device to which the present disclosure is applicable;

FIG. 8A illustrates a surplus length stowing process using the optical fiber holder according to another embodiment, suitable for a case in which the surplus lengths of the optical fibers are long;

FIG. 10B illustrates the optical fiber holder of FIG. 10A in which optical fibers connected via an optical adaptor are stowed in the correct position.

DESCRIPTION OF EMBODIMENTS

The embodiments are now described with reference to accompanying drawings. The same elements or components are denoted by the same symbols and redundant explanation for them is omitted.

FIG. 2 illustrates an example of an optical circuit device 10 to which an optical fiber holder of an embodiment is applied. The optical circuit device 10 includes optical circuit components 12-1 through 12-7 (which may be referred to simply as "optical circuit component 12") accommodated in a case 15. The optical circuit components 12-1 through 12-7 are mutually connected via optical fibers 11-1 and 11-2. A set of optical fibers 11-1 and a set of optical fibers 11-2 are bonded together typically by fiber fusion splicing. In order to place the optical fibers 11-1 and 11-2 onto a splicer (not shown), optical fibers 11-1 and 11-2 are pulled out from a fiber extraction opening 10a of the optical circuit device 10. For the illustration purpose, an optical fiber 11-1 extracted from a first optical circuit component 12 is depicted by a solid line, and an optical fiber 11-2 extracted from a second optical circuit component 12 to be connected to the first optical circuit component 12 is depicted by a dashed line. However, the optical fibers 11-1 and 11-2 are generally made of the same material under the same specification.

Figure 1A:
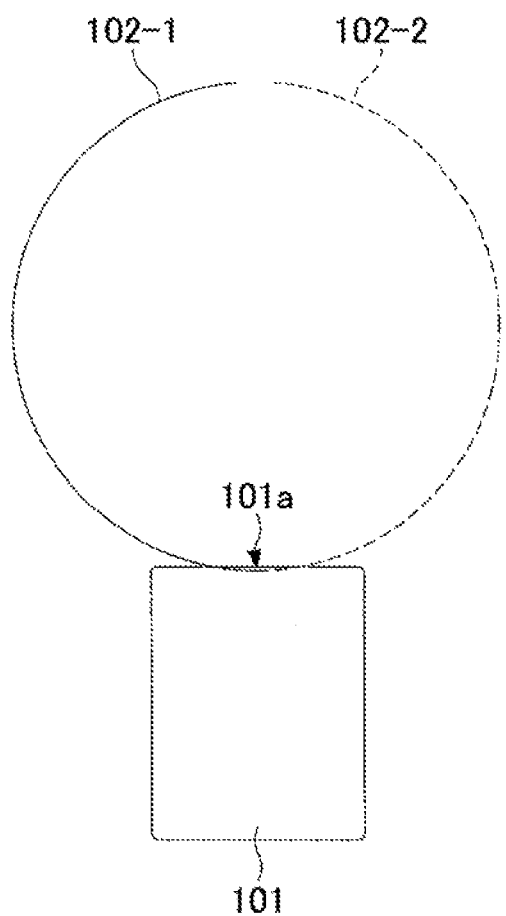
FIG. 1A is a schematic diagram illustrating a conventional technique of stowing surplus lengths of optical fibers.
Figure 1B:
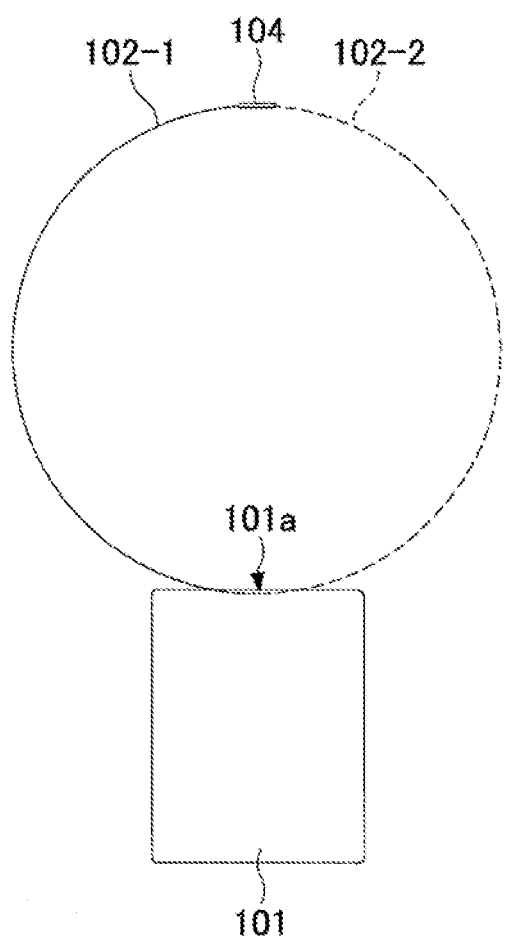
FIG. 1B is a schematic diagram illustrating the conventional technique of stowing surplus lengths of optical fibers.
Figure 1C:
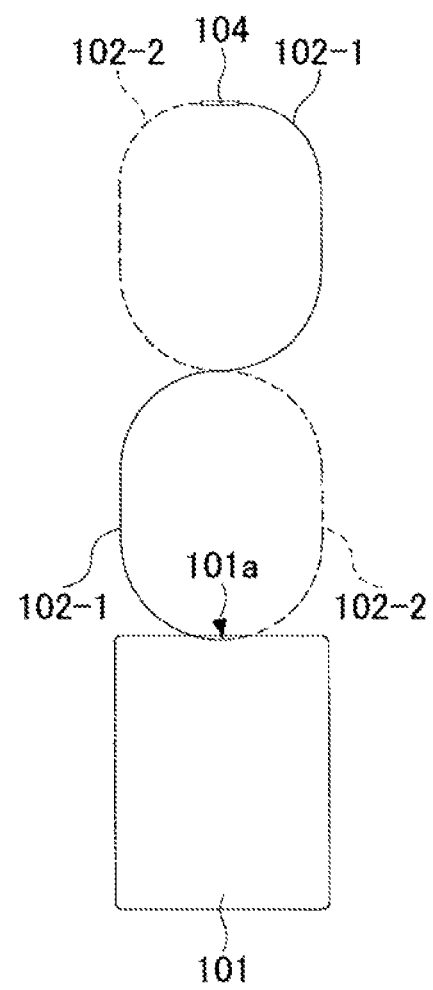
FIG. 1C is a schematic diagram illustrating the conventional technique of stowing surplus lengths of optical fibers.
Figure 1D:
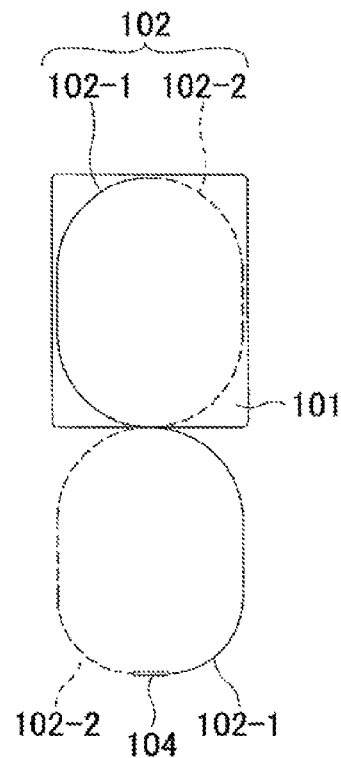
FIG. 1D is a schematic diagram illustrating the conventional technique of stowing surplus lengths of optical fibers.
Figure 1E:
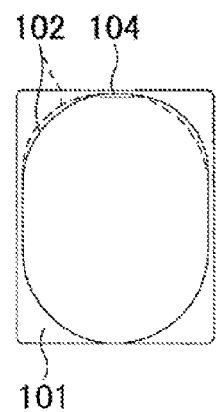
FIG. 1E is a schematic diagram illustrating the conventional technique of stowing surplus lengths of optical fibers.
Figure 3:
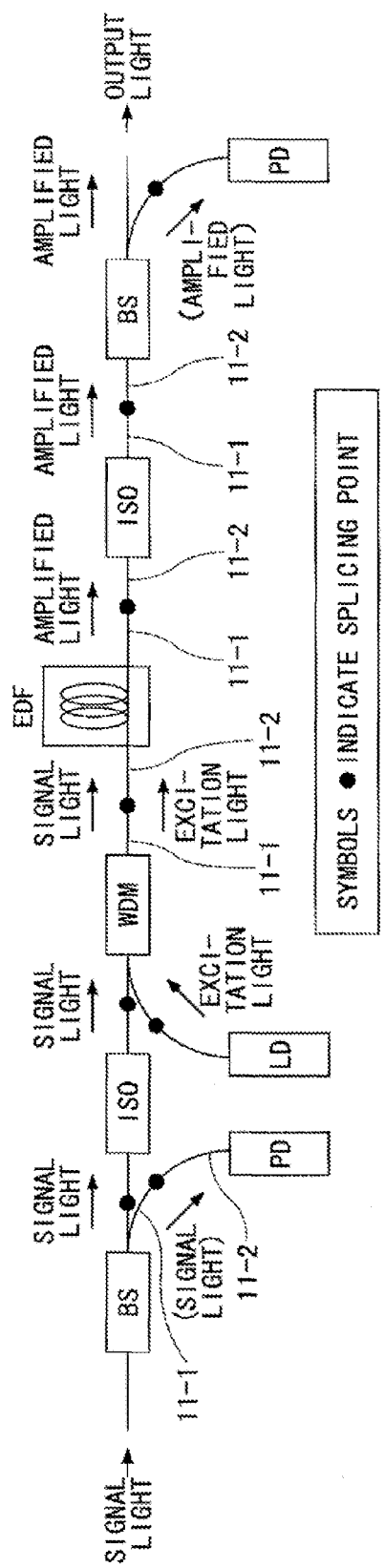
FIG. 3 illustrates an example of a general structure of an optical circuit device.

FIG. 3 illustrates an example of a typical optical circuit. The optical circuit includes a beam splitter (BS) for splitting a signal light, a photo diode (PD) for detecting the signal light, a laser diode (LD) for emitting excitation light, a WDM coupler, an amplifier (EDF), etc. These components are arranged at appropriate positions in the case of the optical circuit device 10. The black circles indicate fiber splicing points. The optical fibers 11-1 and 11-2, which are to be connected at the splicing points, are pulled out from the optical circuit device 10 and joined altogether by fusion splicing.

Figure 4A:
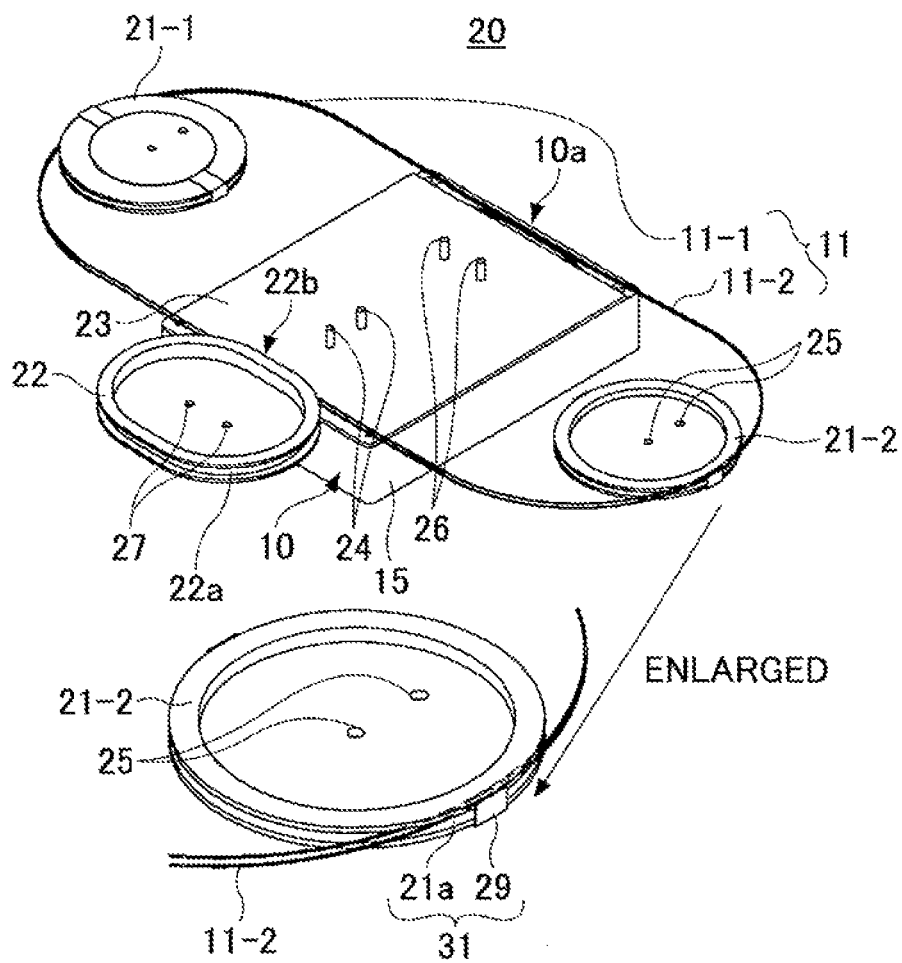
FIG. 4A illustrates an example of an optical fiber holder according to an embodiment, in which a set of optical fiber guides has not been secured.
Figure 4B:
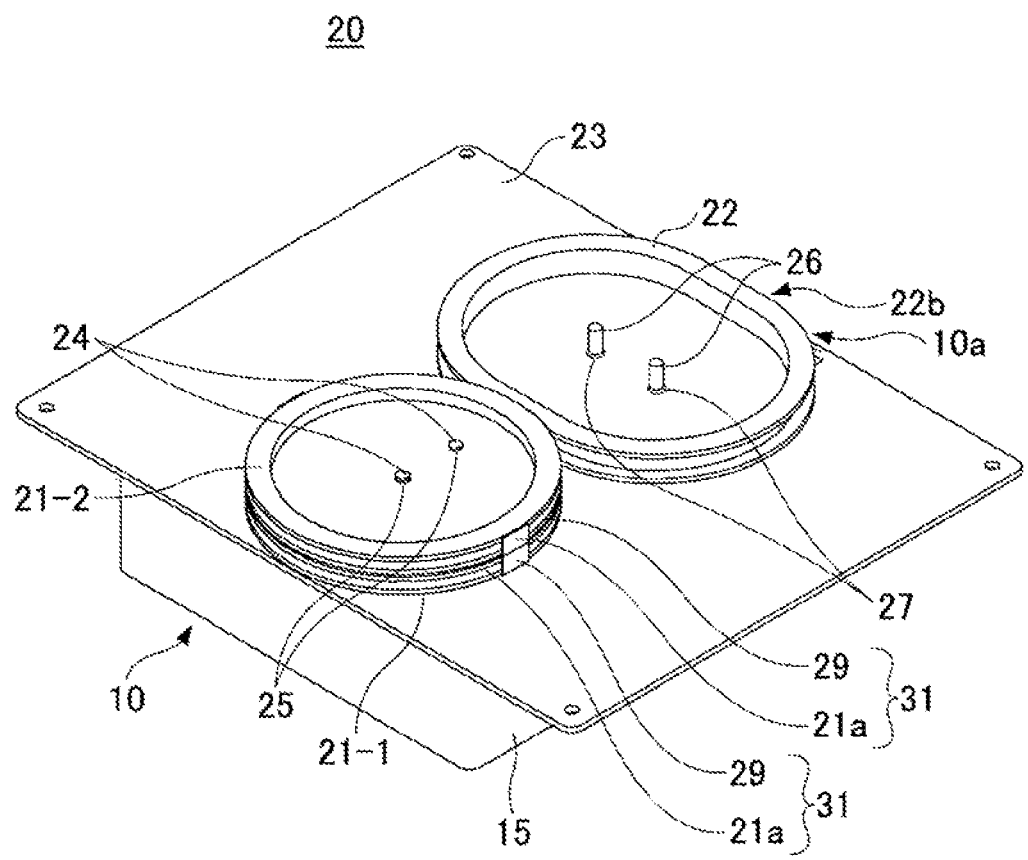
FIG. 4B illustrates the optical fiber holder of FIG. 4A in which the set of optical fiber guides has been secured on the holder tray.

FIG. 4A and FIG. 4B are schematic diagrams of an optical fiber holder 20 according to an embodiment. FIG. 4A illustrates optical fibers 11-1 and 11-2 pulled out from the fiber extraction opening 10a of the optical circuit device 10 and wound between a pair of first optical fiber guides 21-1 and 21-2 and a second optical fiber guide 22 during a surplus length stowing process. In this state, the surplus length stowing process is in the middle, and the optical fiber guides 21-1, 21-2 and 22 have not been secured on a tray 23. FIG. 4B illustrates the first optical fiber guides 21-1 and 21-2 and the second optical fiber guide 22 secured on the tray 23 with the optical fibers 11-1 and 11-2 (not shown in FIG. 4B) taken up to the last.

The optical fiber holder 20 includes the pair of optical fiber guides 21-1 and 21-2, the second optical fiber guide 22, and the tray 23 for accommodating the first optical fiber guides 21-1 and 21-2 and the second optical fiber guide 22. The second optical fiber guide 22 has a fiber retainer 22b for retaining the spliced portion of the optical fibers 11-1 and 11-2. The optical fiber 11-1 and the optical fiber 11-2 originally extend from separate optical components and form a loop of optical fiber 11 through the splicing.

The first optical fiber guides 21-1 and 21-2 and the second optical fiber guide 22 satisfy a prescribed condition of bending radius. The bend radius condition in this example is that the bending radius of the optical fiber 11 wound between the optical fiber guides 21-1, 21-2 and 22 is at or above the minimum bend radius allowed by the specification of the optical fiber 11 so as not to cause signal degradation. In the example illustrated in FIG. 4A and FIG. 4B, the first optical fiber guides 21-1 and 21-2 have round shapes and the second fiber guide 22 has an oval shape in a plan view. However, the present disclosure is not limited to this example. At least a portion of the periphery of each of the first optical fiber guides 21-1 and 21-2 and the second optical fiber guide 22 may be formed in an arc that satisfies the bend radius condition of the optical fiber 11. Accordingly, the first optical fiber guides 21-1 and 21-2 may be shaped in ovals or ellipses in a plan view.

Each of the first optical fiber guides 21-1 and 21-2 has an optical fiber holding groove 21a along the periphery thereof and a fiber stopper piece 29 for preventing the optical fiber 11 from coming off or loosening. The optical fiber holding groove 21a and the fiber stopper piece 29 provide an optical fiber stopper structure 31.

The second optical fiber guide 22 has a guide groove 22a for reeling the spliced optical fibers 11-1 and 11-2 which are guided by the first optical fiber guides 21-1 and 21-2. A part of the guide grove 22a serves as a fiber retainer 22b that retains the spliced portion of the optical fibers 11-1 and 11-2.

The tray 23 includes second guide fixing pins 26 for securing the second optical fiber guide 22, and first guide fixing pints 24 for securing the first optical fiber guides 21-1 and 21-2. The second optical fiber guide 22 has guide holes 27 for receiving the second guide fixing pins 26. The first optical fiber guides 21-1 and 21-2 have guide holes 25 for receiving the first guide fixing pins 24.

In the example illustrated in FIG. 4A and FIG. 4B, the tray 23 is furnished with the fixing pins 24 and 26, while guide holes 25 and 27 are formed in the first optical fiber guides 21 and the second optical fiber guide 22 for receiving the guide pins 24 and 26, respectively, to provide a securing structure. However, the present disclosure is not limited to this example. The tray 22 may be furnished with L-shaped or U-shaped ribs or grooves, while correspondingly shaped grooves or ribs may be formed in the first and second optical fiber guides 21 and 22.

The surplus length of the looped (joined) optical fibers 11-1 and 11-2 is stretched between the pair of the first optical fiber guides 21-1 and 21-2 and wound around the second optical fiber guide 22 secured on the tray 23, as described below in more detail. In this winding process, at least a portion of the optical fibers 11-1 and 11-2 are taken up in the guide groove 22a of the second optical fiber guide 22.

In the perspective view of FIG. 4B, the optical fibers (not shown in this figure) are stowed onto the tray 23 using the first optical fiber guides 21-1 and 21-2 and the second optical fiber guide 22. The second optical fiber guide 22 is secured to the tray 23 by the fixing pins 26 which are fit into the guide holes 27 of the second optical fiber guide 22. The pair of the first optical fiber guides 21-1 and 21-2 are stacked on the tray 23 and secured to the tray 23 by the fixing pins 24. The tray 23 of the optical fiber holder 20 may be fabricated monolithically with the case 15 of the optical circuit device 10. The optical fiber holder 20 and the optical circuit device 10 form an optical device.

The distance from the fiber extraction opening 10a of the optical circuit device 10 to the fixed position (or the fiber retainer 22b) of the second optical fiber guide 22 is set smaller than the distance between the fiber extraction opening 10a and the fixed positions (or the parts closest to the fiber extraction opening 10a) of the first optical fiber guides 21-1 and 21-2-a. This arrangement allows the second optical fiber guide 22 to contribute to take-up of the optical fibers 11-1 and 11-2 using the first optical fiber guides 21-1 and 21-2.

No twisting is involved during the surplus length stowing process of FIG. 4A, nor in the finally stowed state of FIG. 4B. How to exclude twisting factors is explained below in conjunction with FIG. 5A through FIG. 5G.

FIG. 5A through FIG. 5G illustrate a surplus length stowing process using the optical fiber holder 20 illustrate in FIG. 4A and FIG. 4B. In this process, the surplus lengths of the optical fibers 11-1 and 11-2 pulled out from the optical circuit device 10 are stowed on the tray 23 in good order. In the embodiment described below, the process starting from the splicing of the optical fibers 11-1 and 11-2 up to the completion of the stowing is automated.

Figure 5A:
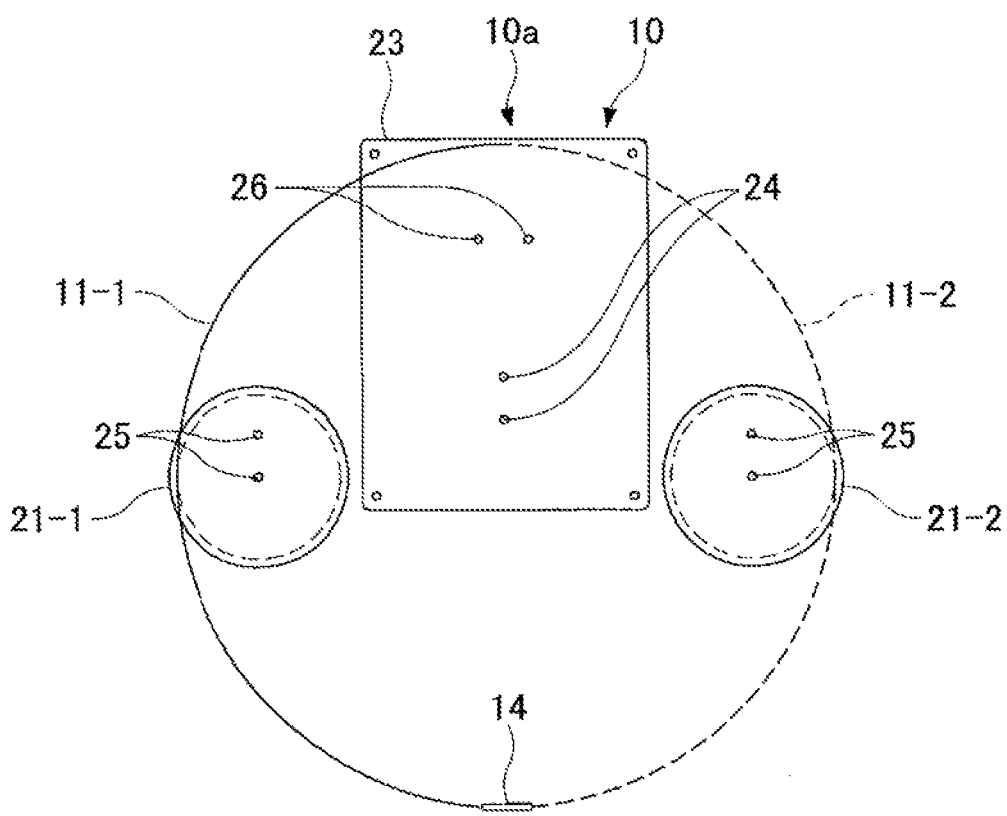
FIG. 5A illustrates a surplus length stowing process using the optical fiber holder according to an embodiment.

First, as illustrated in FIG. 5A, optical fibers 11-1 and 11-2 pulled out from the fiber extraction opening 10a of the optical circuit device 10 are placed end-to-end on a splicer (not shown) and joined to each other by fusion splicing. Although the optical fibers are depicted as a single solid line 11-1 and a single dashed line 11-2, multiple optical fibers 11-1 and multiple optical fibers 11-2 are pulled out from the fiber extraction opening 10a. The holder tray 23 is fabricated monolithically with the optical circuit device 10. The tray 23 is furnished with first guide fixing pins 24 for securing the first fiber guides 21-1 and 21-2 and second fixing pins 26 for securing the second fiber guide 22 (not shown in FIG. 5A).

The spliced portion of each pair of optical fibers 11-1 and 11-2 is protected by a protection sleeve 14 to prevent signal loss from occurring at the splice. In this example, two sets of optical fibers, each set including multiple optical fibers with outer diameters ($\phi$) of 250 µm and arranged parallel to each other, are spliced together. The protection sleeve 14 provided to each splice has an outer diameter of 1 mm and a length of 12 mm. The protection sleeves 14 may be bundled together by an adhesive.

The form of the splice between the optical fibers 11-1 and 11-2 is defined by the shape of the protection sleeve 14. For example, the splice is straight when using a straight sleeve. The shape of the fiber retainer 22b of the second optical fiber guide 22 (see FIG. 4A and FIG. 4B) is also defined by the shape of the protection sleeve 14. In this example, the second optical fiber guide 22 has a straight part corresponding to the shape of the protection sleeve 14.

The first optical fiber guides 21-1 and 21-2 held by arms of a surplus length processing apparatus (not shown) are placed onto a splicer to receive the joined optical fibers 11-1 and 11-2 at the fiber holding grooves 21a (see FIG. 4A). The first optical fiber guides 21-1 and 21-2 are round reels made of a resin. The diameter of the reel is appropriately selected in the range from 30 mm to 60 mm so as to satisfy the condition of the allowable bending radius (the minimum bending radius) of the optical fibers 11-1 and 11-2. In the state of FIG. 5A, the joined optical fibers 11-1 and 11-2 are held by the first optical fiber guides 21-1 and 21-2.

Figure 5B:
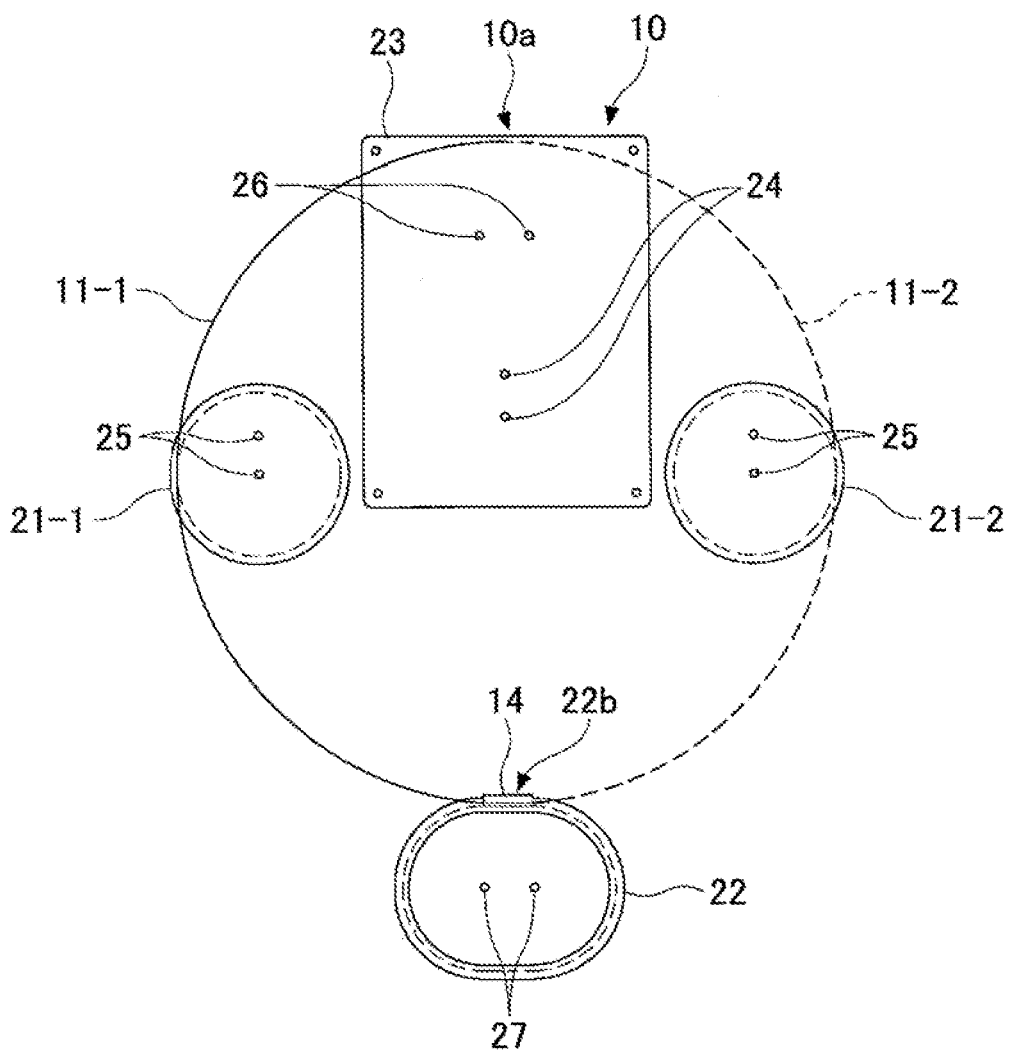
FIG. 5B illustrates a surplus length stowing process using the optical fiber holder according to an embodiment.

Next, as illustrated in FIG. 5B, the second optical fiber guide 22 is mounted onto the splicer (not shown) by an arm of the surplus length processing apparatus (not shown). The second optical fiber guide 22 receives the spliced portion, i.e., the bundle of protection sleeves 14 in this example, between the optical fibers 11-1 and 11-2 at the fiber retainer 22b of the guide groove 22a (see FIG. 4A). The second optical fiber guide 22 is an ellipse having a straight part as a part of the guide groove 22a, and the straight part of the guide groove 22a serves as the fiber retainer 22b.

Figure 5C:
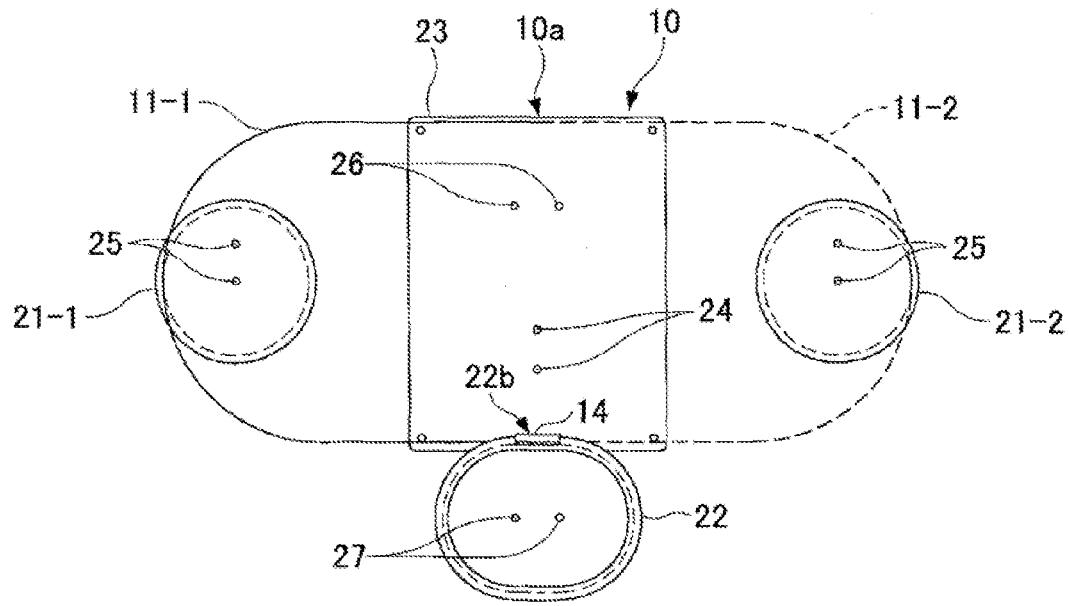
FIG. 5C illustrates a surplus length stowing process using the optical fiber holder according to an embodiment.

Next, as illustrated in FIG. 5C, the first optical fiber guides 21-1 and 21-2 are moved away from each other, while the second optical fiber guide 22 is moved straight toward the fiber extraction opening 10a of the tray 23 without causing rotation. The optical fibers 11-1 and 11-2 wound around the first optical fiber guides 21-1 and 21-2 are held by the stopper structures 31 (see FIG. 4A) so as not to come off from the fiber holding grooves 21a.

Figure 5D:
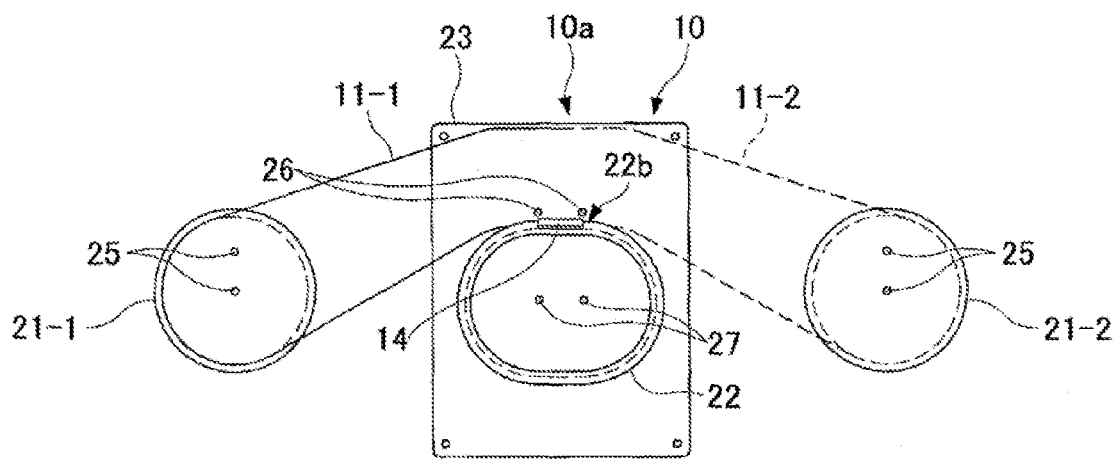
FIG. 5D illustrates a surplus length stowing process using the optical fiber holder according to an embodiment.
Figure 5E:
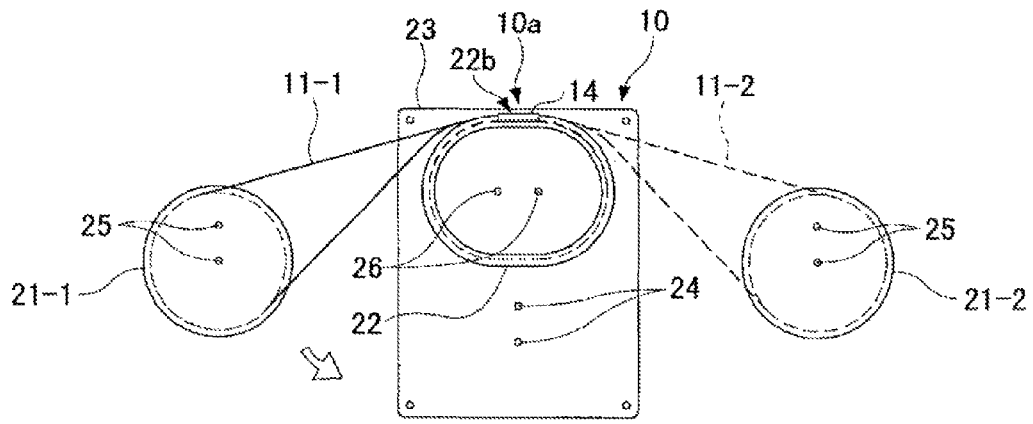
FIG. 5E illustrates a surplus length stowing process using the optical fiber holder according to an embodiment.

As illustrated in FIG. 5D and FIG. 5E, the second optical fiber guide 22 is continuously moved over the tray 23 until it reaches a prescribed position next to the fiber extraction opening 10a. When having reached the prescribed position, the second optical fiber guide 22 is secured onto the tray 23 by the second guide fixing pins 26 provided on the tray 23. To be more precise, the second optical fiber guide 22 held by the arm of the surplus length processing apparatus (not shown) is brought down onto the tray 23 such that the second guide fixing pins 26 are fit into the guide holes 27 of the second optical fiber guide 22. At this position, the fiber retainer 22b of the second optical fiber guide 22 is positioned next to the fiber extraction opening 10a of the optical circuit device 10.

Figure 5F:
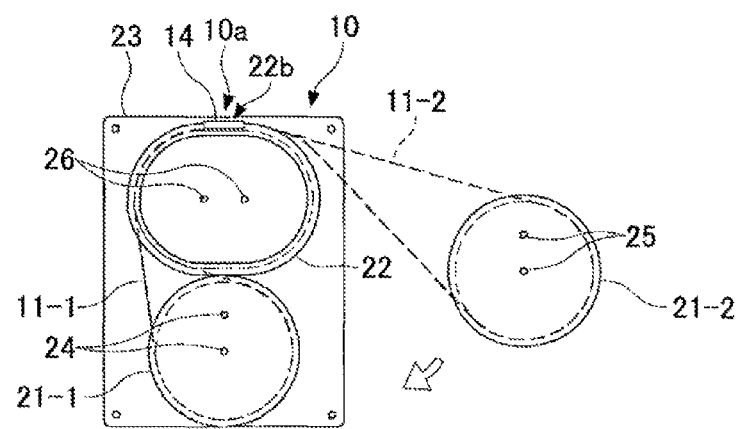
FIG. 5F illustrates a surplus length stowing process using the optical fiber holder according to an embodiment.

Then, as indicated by the arrow in FIG. 5E, one of the first optical fiber guides, e.g., the optical fiber guide 21-1 is rotated around the second optical fiber guide 22 in a counterclockwise direction. The first optical fiber guide 21-1 is then secured onto the tray 23 by the first guide fixing pins 24, as illustrated in FIG. 5F. By the rotational motion of the first optical fiber guide 21-1, the surplus length of the optical fiber 11-1 wound around the first optical fiber guide 21-1 is taken up in the guide groove 22a (see FIG. 4A) of the second optical fiber guide 22.

Figure 5G:
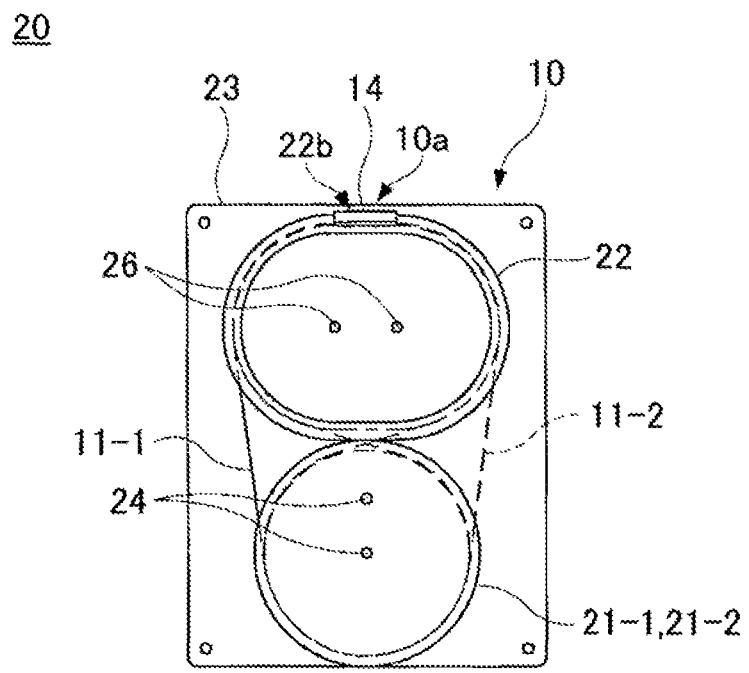
FIG. 5G illustrates a surplus length stowing process using the optical fiber holder according to an embodiment.

Then, as indicated by the arrow in FIG. 5F, the other of the first optical fiber guides, e.g., the optical fiber guide 21-2 is rotated around the second optical fiber guide 22 in a clockwise direction. The first optical fiber guide 21-2 is then stacked over the first optical fiber guide 21-1 and secured onto the tray 23 by the first guide fixing pins 24, as illustrated in FIG. 5G. By the rotational motion of the first optical fiber guide 21-2, the surplus length of the optical fiber 11-2 wound around the first optical fiber guide 21-2 is taken up in the guide groove 22a of the second optical fiber guide 22. By inserting the first guide fixing pins 24 into the guide holes 25 of the first optical fiber guide 21-2, the optical fiber guide 21-2 is stacked onto the already secured optical fiber guide 21-1. In this state, the surplus length of the optical fiber 11 held by the pair of the first optical fiber guides 21-1 and 21-2 and the second optical fiber guide 22 are stowed on the tray 23 fabricated monolithically with the optical circuit device 10.

The distance between the fiber extraction opening 10a of the optical circuit device 10 and the fixing position (or the fiber retainer 22b) of the second optical fiber guide 22 is set smaller than that between the first extraction opening 10a and the fixing position of the first optical fiber guides 21-1 and 21-2. This arrangement allows the second optical fiber guide 22 to contribute to the take-up operation of the first optical fiber guides 21-1 and 21-2 to take up the surplus length of the optical fibers 11-1 and 11-2. The sequence of the rotational motions and the mounting order of the first optical fiber guides 21-1 and 21-2 are not limited to the illustrated example. The optical fiber guide 21-2 may be rotated and secured on the tray 23 first, and then the other optical fiber guide 21-1 may be rotated and secured to take up the remaining portion of the surplus length.

The above-described surplus length stowing process does not involve twisting of the optical fibers 11-1 and 11-2. As a constraint for preventing degradation of optical signals propagating through the optical fiber 11, the bending radius of the optical fiber 11 is limited to the allowable radius of curvature. If the optical fiber 11 is twisted, microbending is produced. Since the position at which microbending has occurred cannot be determined visually, optical transmission loss occurs inevitably. In contrast, the surplus length stowing process of the embodiment does not produce undesirable microbending, and the reliability in operations of the optical circuit device 10 can be maintained.

Figure 6A:
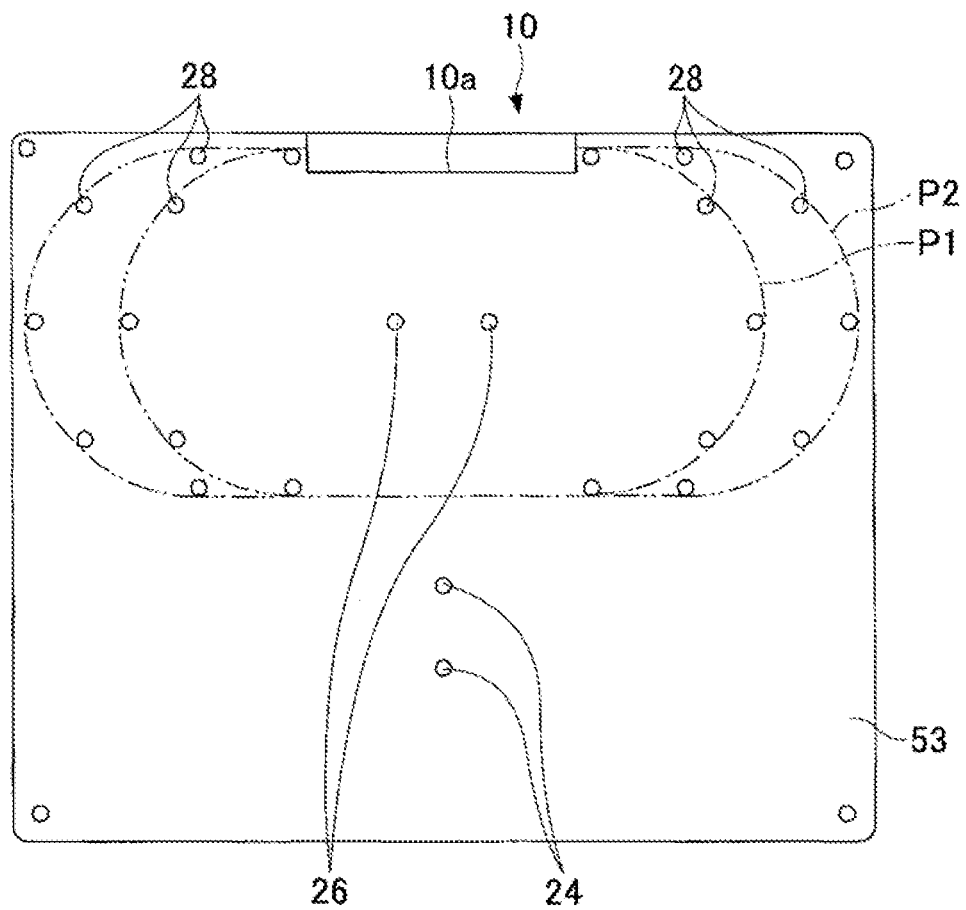
FIG. 6A illustrates a modification of a tray used in the optical fiber holder.
Figure 6B:
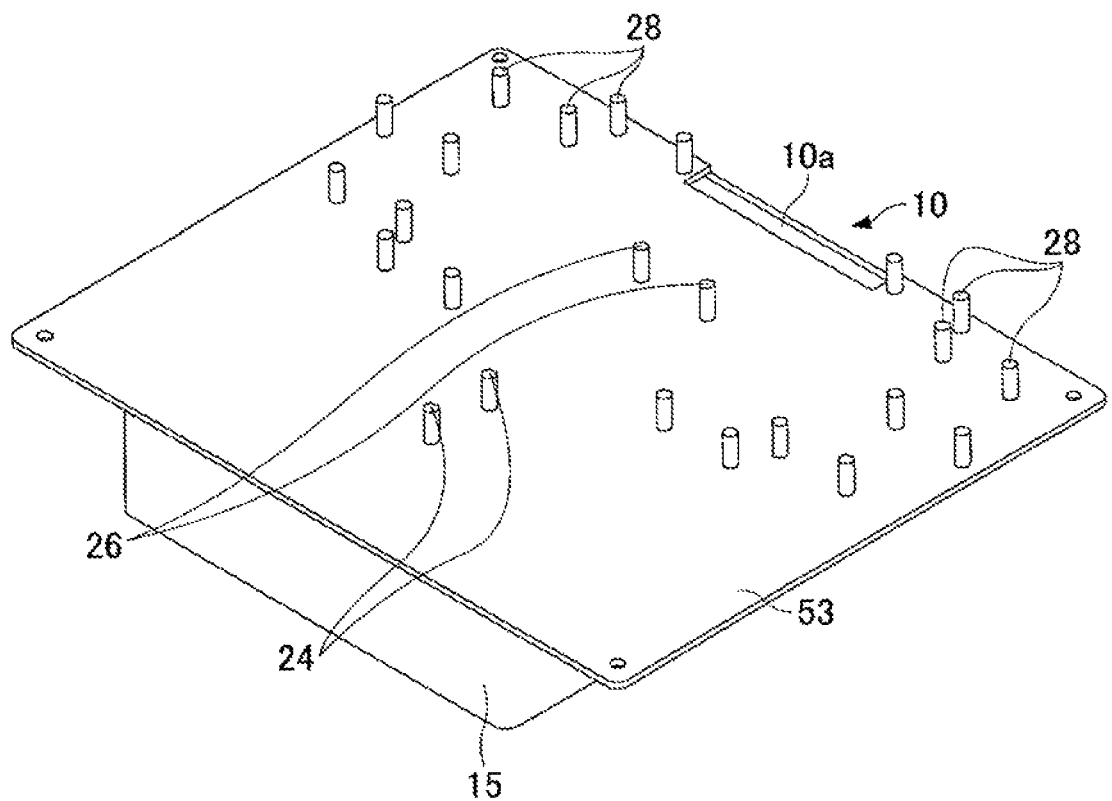
FIG. 6B is a perspective view of the holder tray of FIG. 6A.

FIG. 6A and FIG. 6B illustrate a modification of the tray for holding optical fibers 11. A tray 53 includes surplus length treating pins 28 for tensing the surplus length of the optical fibers 11, in addition to the first guide fixing pins 24 and the second guide fixing pins 26. The fiber extraction opening 10a is formed in the tray 53 to allow the optical fibers 11 to be pulled out of the optical circuit device 10. The lengths of the optical fibers 11 pulled out from the fiber extraction opening 10a and joined to each other may not always be the optimum and the shortest, unlike the previously illustrated case in FIG. 5A through FIG. 5G. Even after the spliced optical fibers 11-1 and 11-2 are taken up around the second optical fiber guide 22 along the guide groove 22a using the first optical fiber guides 21-1 and 21-2, a surplus may still remain. To eliminate such an additional surplus, the optical fibers 11-1 and 11-2 are stretched along the surplus length treating pins 28, depending on the amount of the surplus length of the optical fibers 11-1 and 11-2, in order to hold the optical fibers 11 tightly on the tray 53 without introducing a twist.

The surplus length treating pins 28 are arranged along an arc so as to satisfy the condition of the allowable bending radius of the optical fibers 11-1 and 11-2. The surplus length treating pins 28 define one or more curved (arc-like) paths P1 and P2. Depending on the amount of the surplus, the optical fibers 11-1 and 11-2 are stretched along a selected path using appropriate surplus length treating pins 28 to stow the optical fibers 11-1 and 11-2. The tray 53 may be formed monolithically with the case 15 of the optical circuit device 10.

Figure 7A:
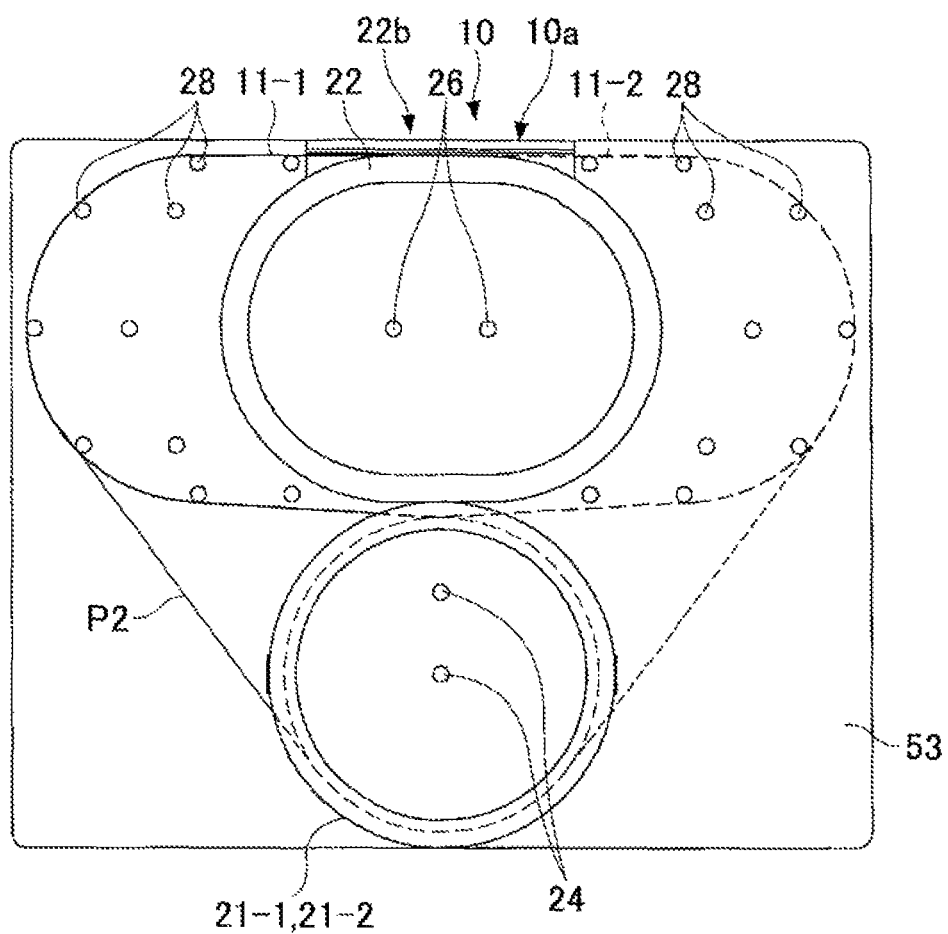
FIG. 7A illustrates an example the fiber holding state using the holder tray of FIG. 6A and FIG. 6B.
Figure 7B:
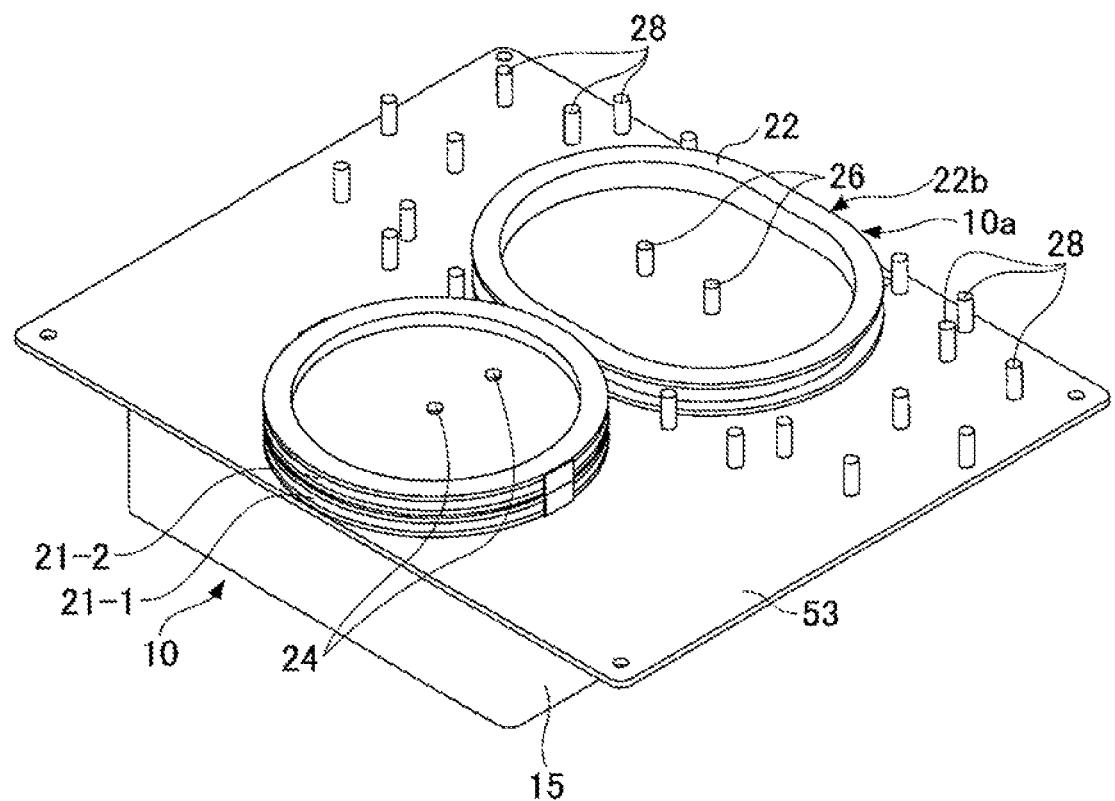
FIG. 7B is a perspective view of the fiber holding state of FIG. 7A.

FIG. 7A and FIG. 7B illustrate how the surplus lengths of the optical fibers 11-1 and 11-2 are stowed on the tray 53 using the surplus length treating pins 28 along the outer arc path P2 illustrated in FIG. 6A and FIG. 6B. FIG. 7A is a plan view and FIG. 7B is a perspective view of the tray 53 on which the first optical fiber guides 21-1 and 21-2 and the second optical fiber guide 22 are secured. (In FIG. 7B, optical fibers 11-1 and 11-2 are omitted for the illustration purpose.) The arc paths defined by the surplus length treating pins 28 are not limited to the example illustrated in FIG. 6A, FIG. 6B, FIG. 7A and FIG. 7B, and the surplus length treating pins 28 may be arranged so as to define three or more curved (arc-like)

paths. In this case, freedom of the pulled-out length of the optical fibers taken out of the optical circuit device 10 is increased.

The distance between the fiber extraction opening 10a formed in the tray 53 of the optical circuit device 10 and the fixing position of the second optical fiber guide 22 is set smaller than that between the fiber extraction opening 10a and the fixing positions of the first optical fiber guides 21-1 and 21-2, as illustrated in FIG. 7A, similarly to the previously illustrated example.

Figure 8B:
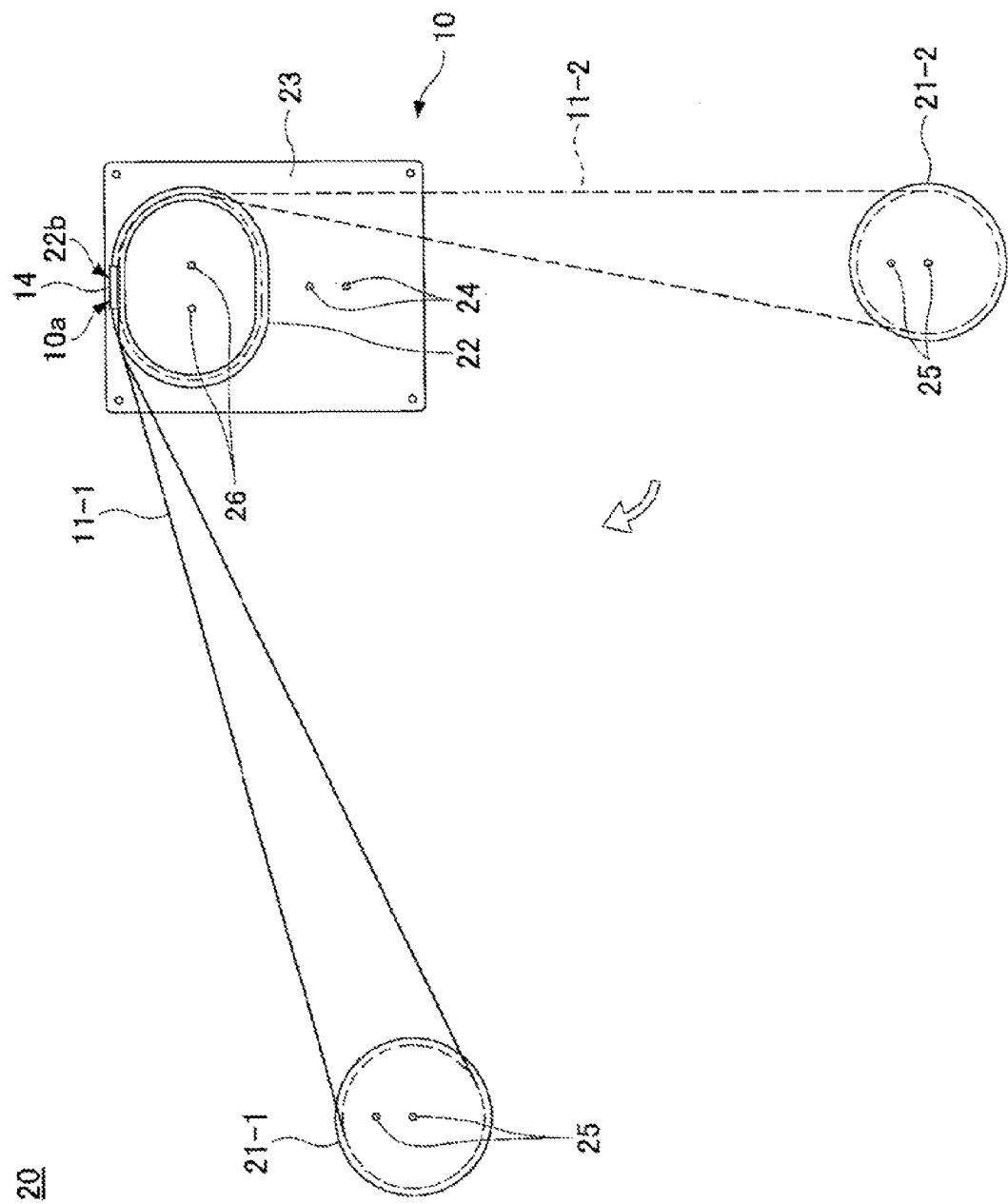
FIG. 8B illustrates the surplus length stowing process following the state of FIG. 8A.
Figure 8C:
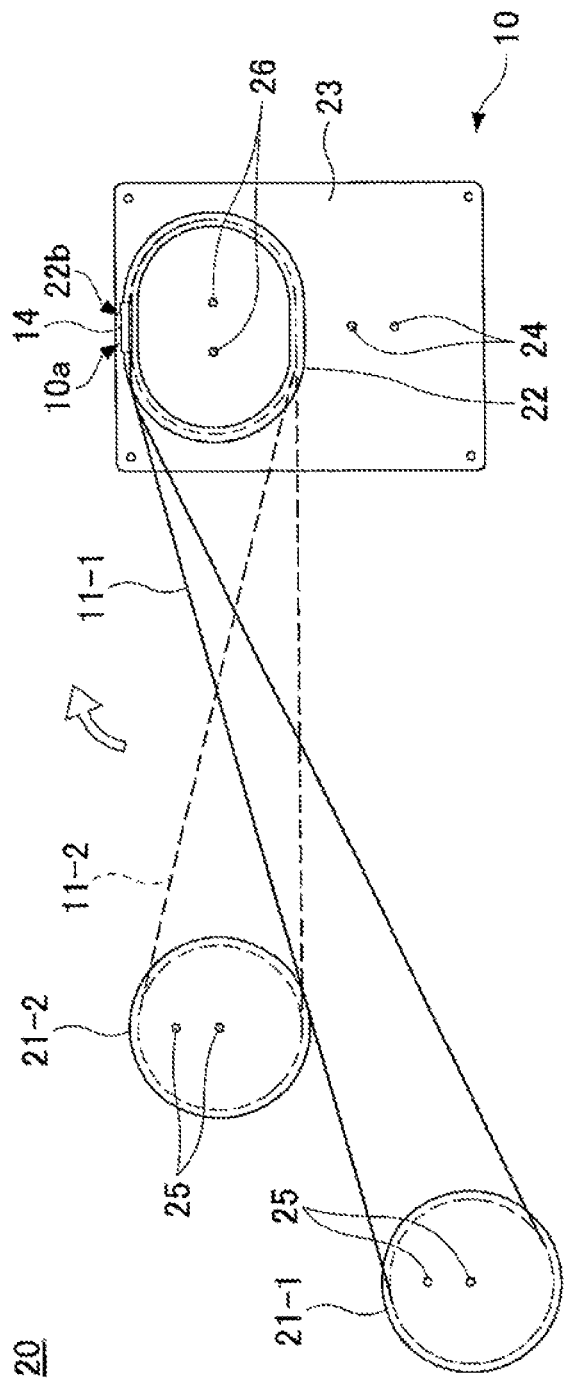
FIG. 8C illustrates the surplus length stowing process following the state of FIG. 8B.
Figure 8D:
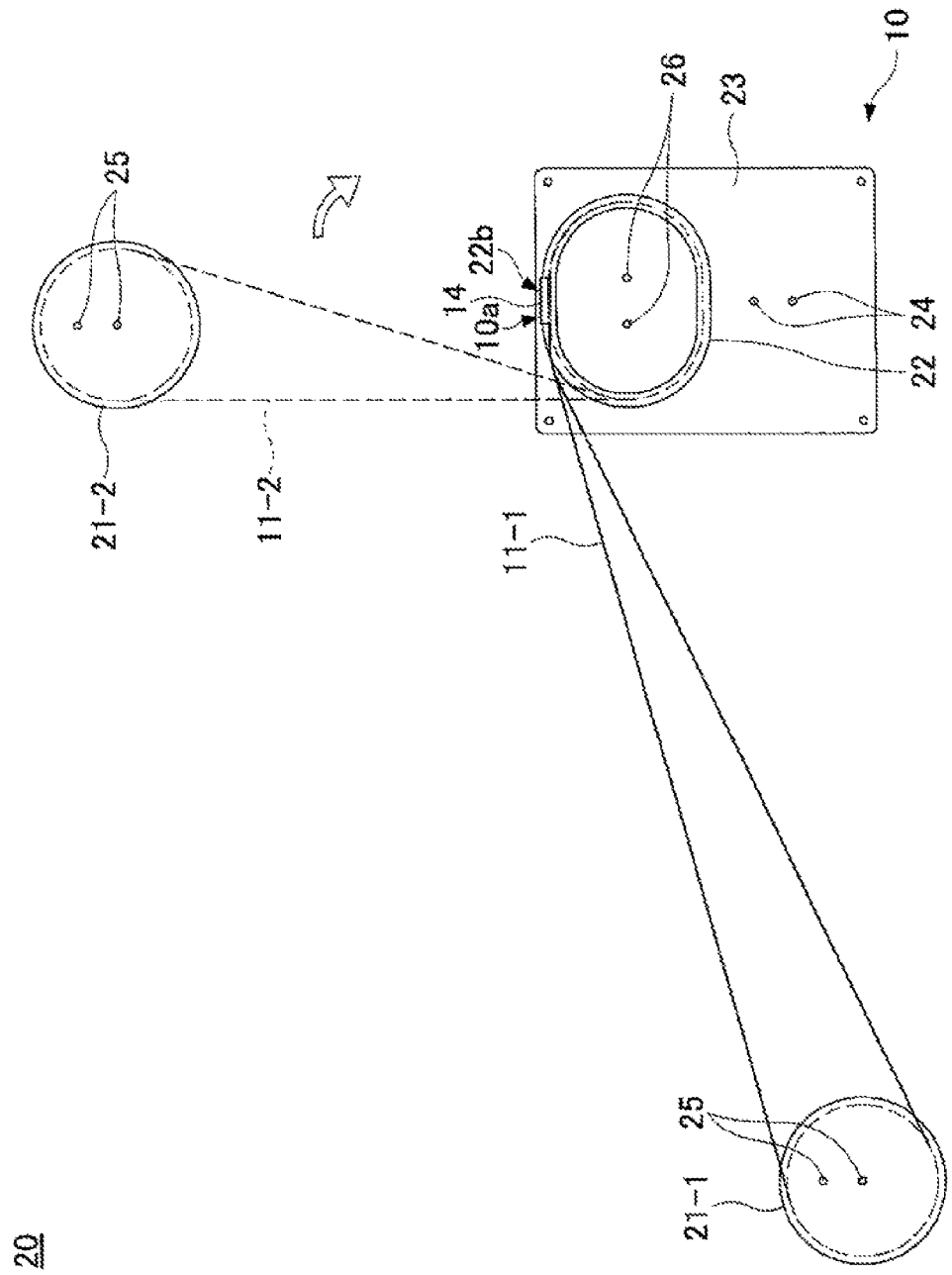
FIG. 8D illustrates the surplus length stowing process following the state of FIG. 8C.
Figure 8E:
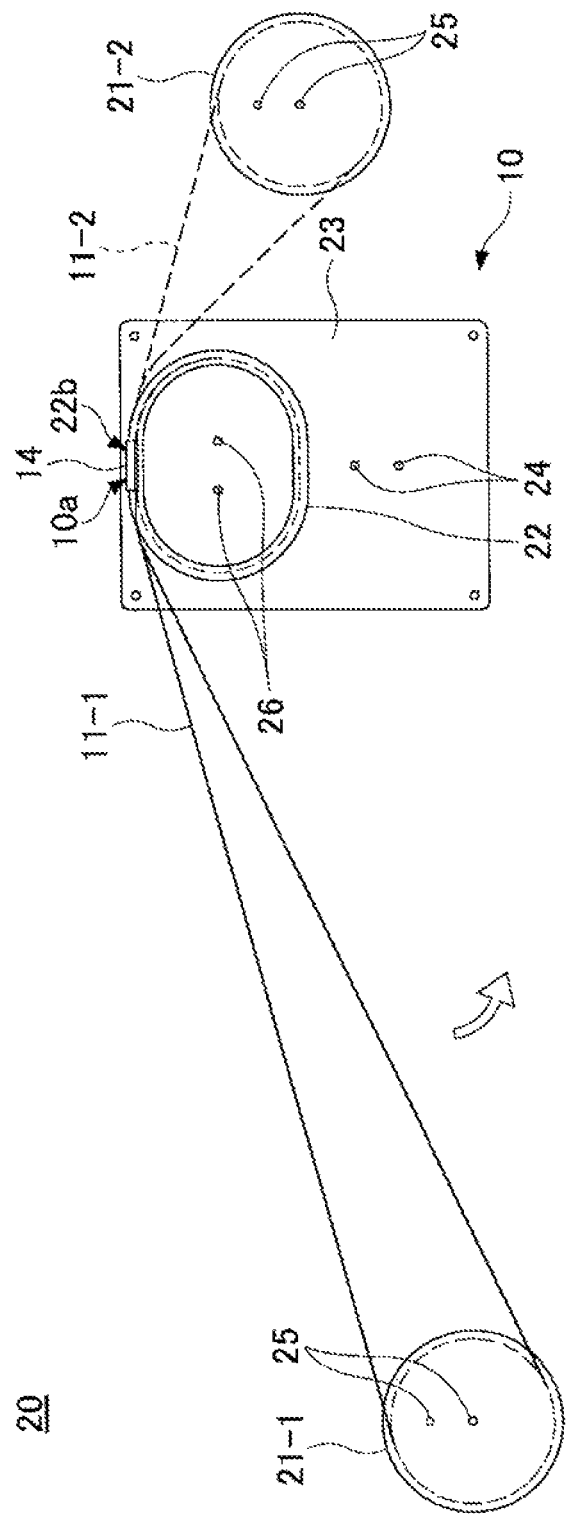
FIG. 8E illustrates the surplus length stowing process following the state of FIG. 8D.
Figure 8F:
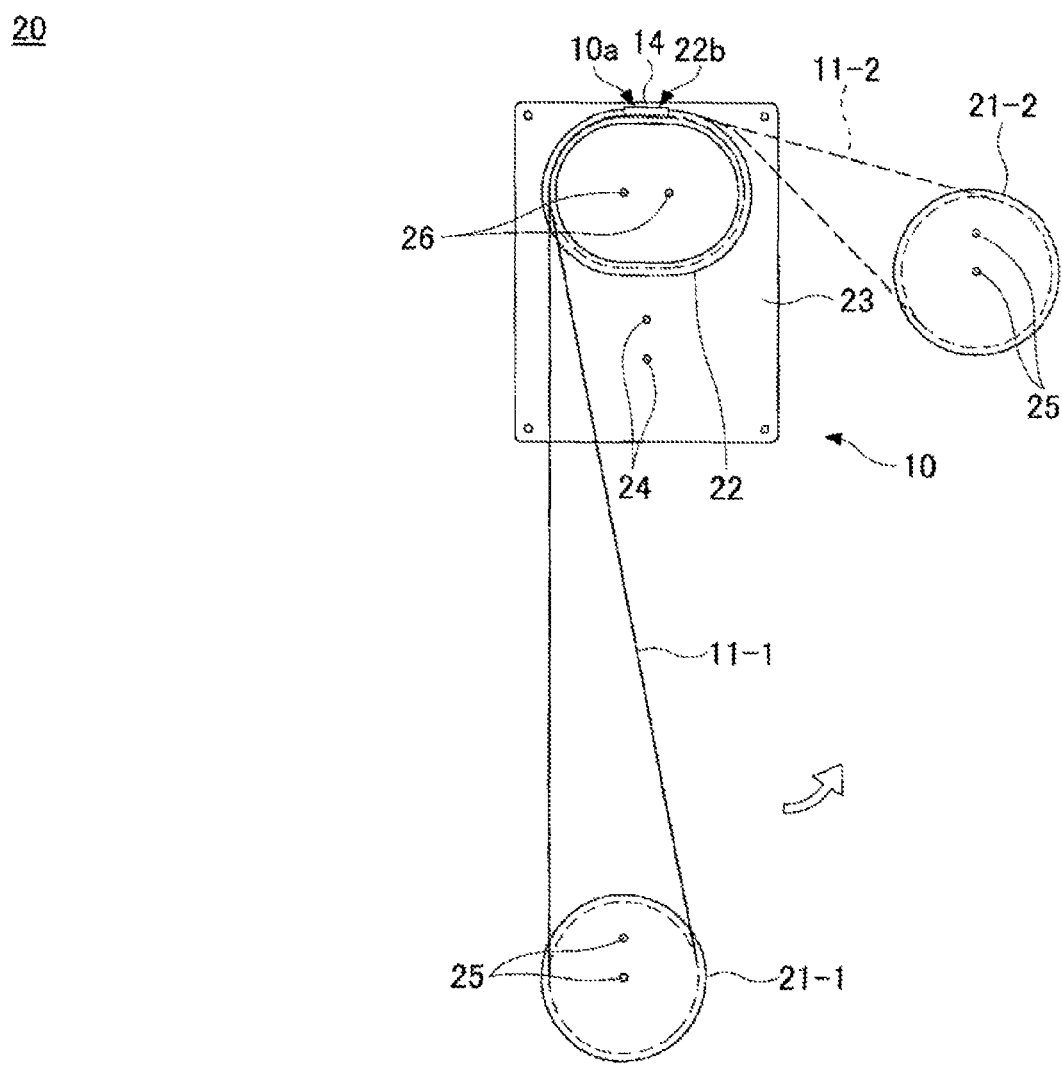
FIG. 8F illustrates the surplus length stowing process following the state of FIG. 8E.
Figure 8G:
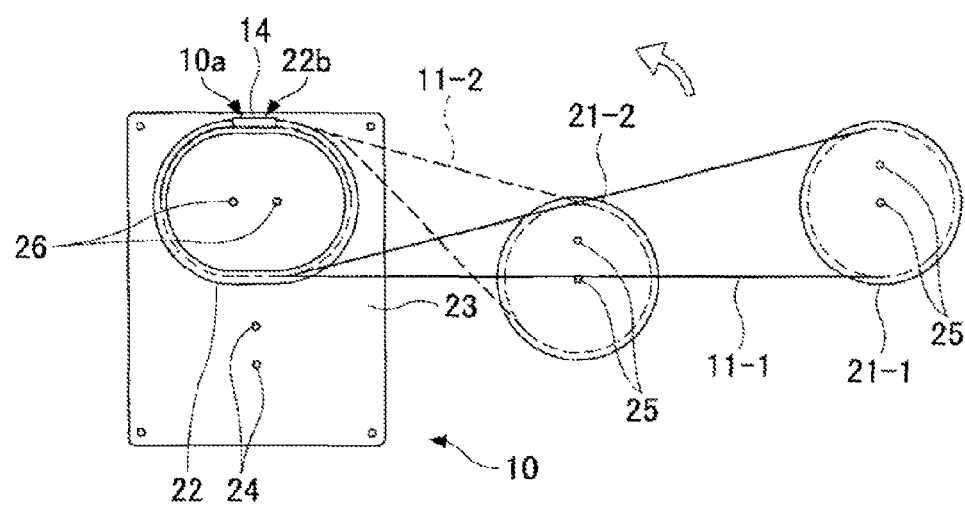
FIG. 8G illustrates the surplus length stowing process following the state of FIG. 8F.
Figure 8H:
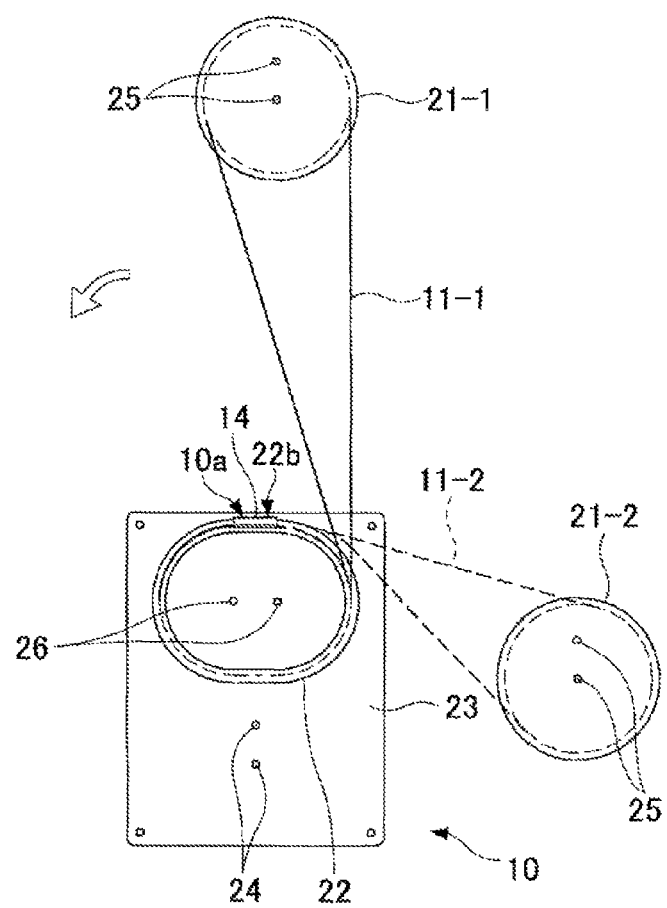
FIG. 8H illustrates the surplus length stowing process following the state of FIG. 8G.
Figure 8I:
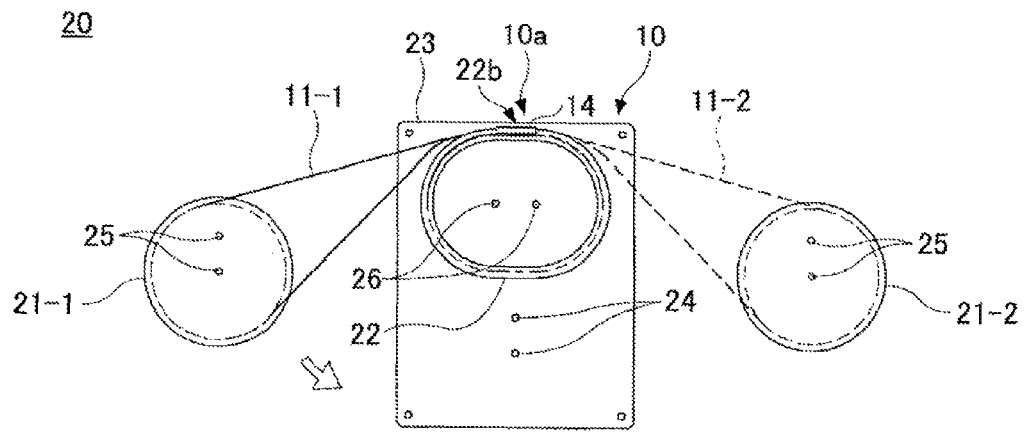
FIG. 8I illustrates the surplus length stowing process following the state of FIG. 8H.

FIG. 8A through FIG. 8K illustrate a surplus length stowing process suitably applied when the lengths of the pulled-out optical fibers are still longer. In FIG. 8A, the second optical fiber guide 22 is secured on the tray 23 by the second guide fixing pins 26. The protection sleeve 14 for protecting the splice between the optical fibers 11-1 and 11-2 is held by the fiber retainer 22b of the second optical fiber guide 22 at a position next to the fiber extraction opening 10a. The process leading to the state illustrated in FIG. 8A is the same as that illustrated in FIG. 5A through FIG. 5F.

As indicated by the arrows in FIG. 8A through FIG. 8D, one of the pair, e.g., the optical fiber guide 21-2 is rotated around the second optical fiber guide 22 in a clockwise direction. The optical fiber 11-2 held around the first optical fiber guide 21-2 is wound around the second optical fiber guide 22 along the guide groove (see FIG. 4A) thereof. When the optical fiber 11-2 has been wound so as to be stowed on the tray 23, the other of the pair, i.e., the first optical fiber guide 21-1 is rotated around the second optical fiber guide 22 on the tray 23 in a counterclockwise direction, as indicated by the arrows in FIG. 8E through FIG. 8I. By this motion, the optical fiber 11-1 held by the first optical fiber guide 21-1 is wound around the second optical fiber guide 22 along the guide groove (see FIG. 4A) thereof.

Figure 8J:
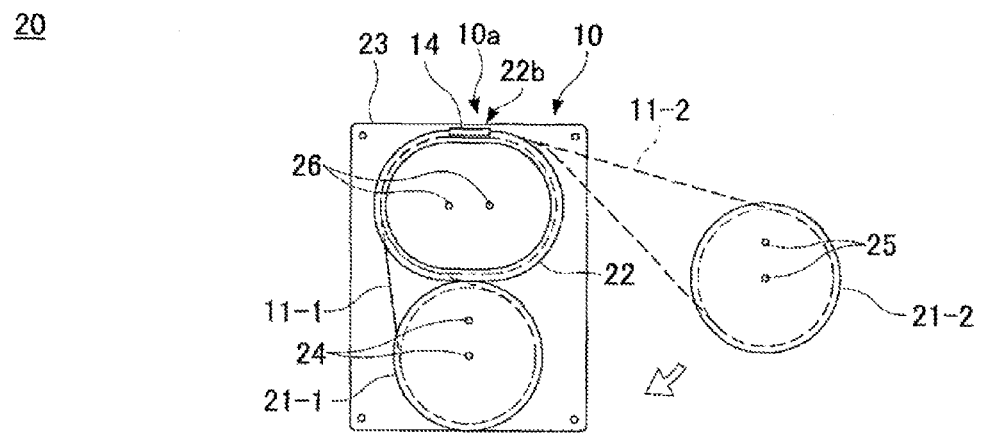
FIG. 8J illustrates the surplus length stowing process following the state of FIG. 8I.
Figure 8K:
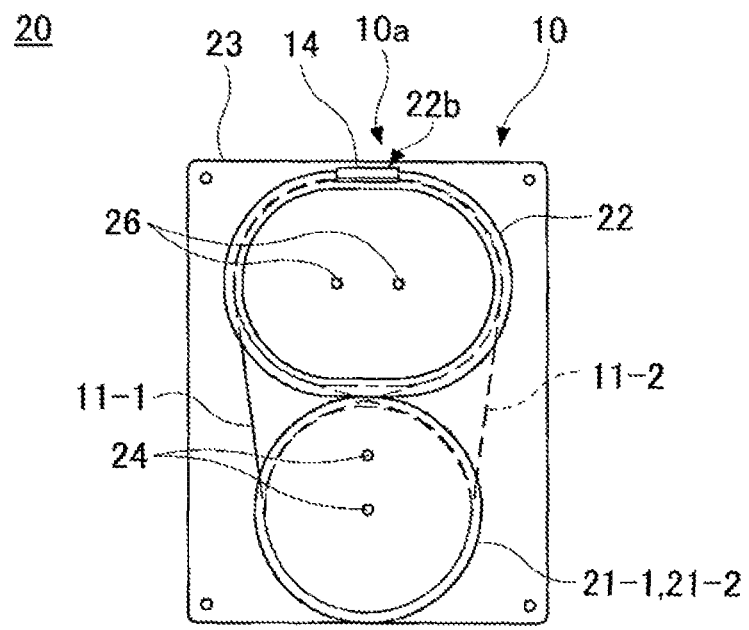
FIG. 8K illustrates the surplus length stowing process following the state of FIG. 8J.

Then, as illustrated in FIG. 8J, one of the first guide pair, e.g., the first optical fiber guide 21-1 is secured onto the tray 23 by the first guide fixing pins 24. The other of the first guide pair, e.g., the first optical fiber guide 21-2 is stacked onto the first optical fiber guide 21-1 using the first guide fixing pins 24, as illustrated in FIG. 8K. In this state, the surplus lengths of the optical fibers 11-1 and 11-2 are stowed efficiently on the tray 23 without introducing twist.

Figure 9A:
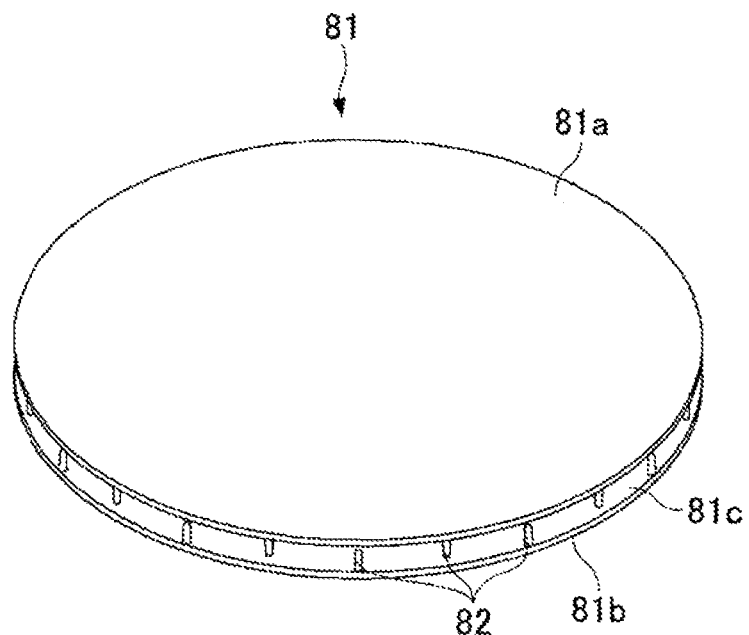
FIG. 9A is a perspective view of a modification of an optical fiber stopper structure for preventing the optical fiber from coming off.
Figure 9B:
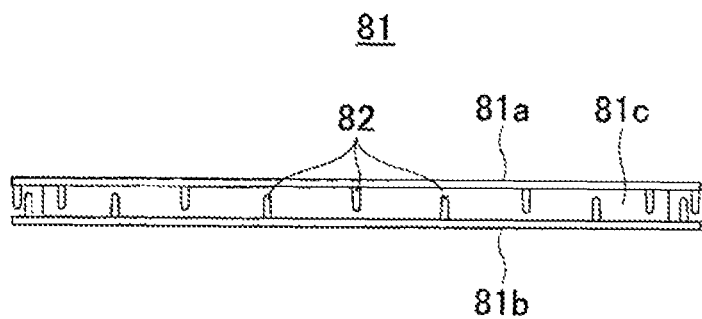
FIG. 9B is a side view of the optical fiber stopper structure of FIG. 9A.

FIG. 9A and FIG. 9B illustrate a modification of the fiber stopper structure for preventing optical fibers from coming off. In the example illustrated in FIG. 4A and FIG. 4B, the optical fiber stopper structure 31 includes a fiber holding groove 21a and the fiber stopper piece 29. In the modification illustrated in FIG. 9A and FIG. 9B, an optical fiber stopper structure 82 includes a plurality of projections 82 made of an elastic material so as not to damage the optical fibers 11 (not shown in FIG. 9A and FIG. 9B). A first optical fiber guide 81 includes a first disk 81a, a second disk 81b, and a fiber take-up space 81c provided between the first and second disks 81a and 81b. The projections 82 serving as the fiber stopper means, are provided along the circumference of at least one of the first and second disks 81a and 81b so as to project into the fiber take-up space 81c. The projections 82 are made of, for example, a rubber or a silicone. It should be noted that, although not depicted in FIG. 9A and FIG. 9B, guide holes, or arbitrarily shaped recesses or protrusions are formed on the first optical fiber guide 81 to secure the first optical fiber guide 81 onto the holder tray.

Figure 10A:
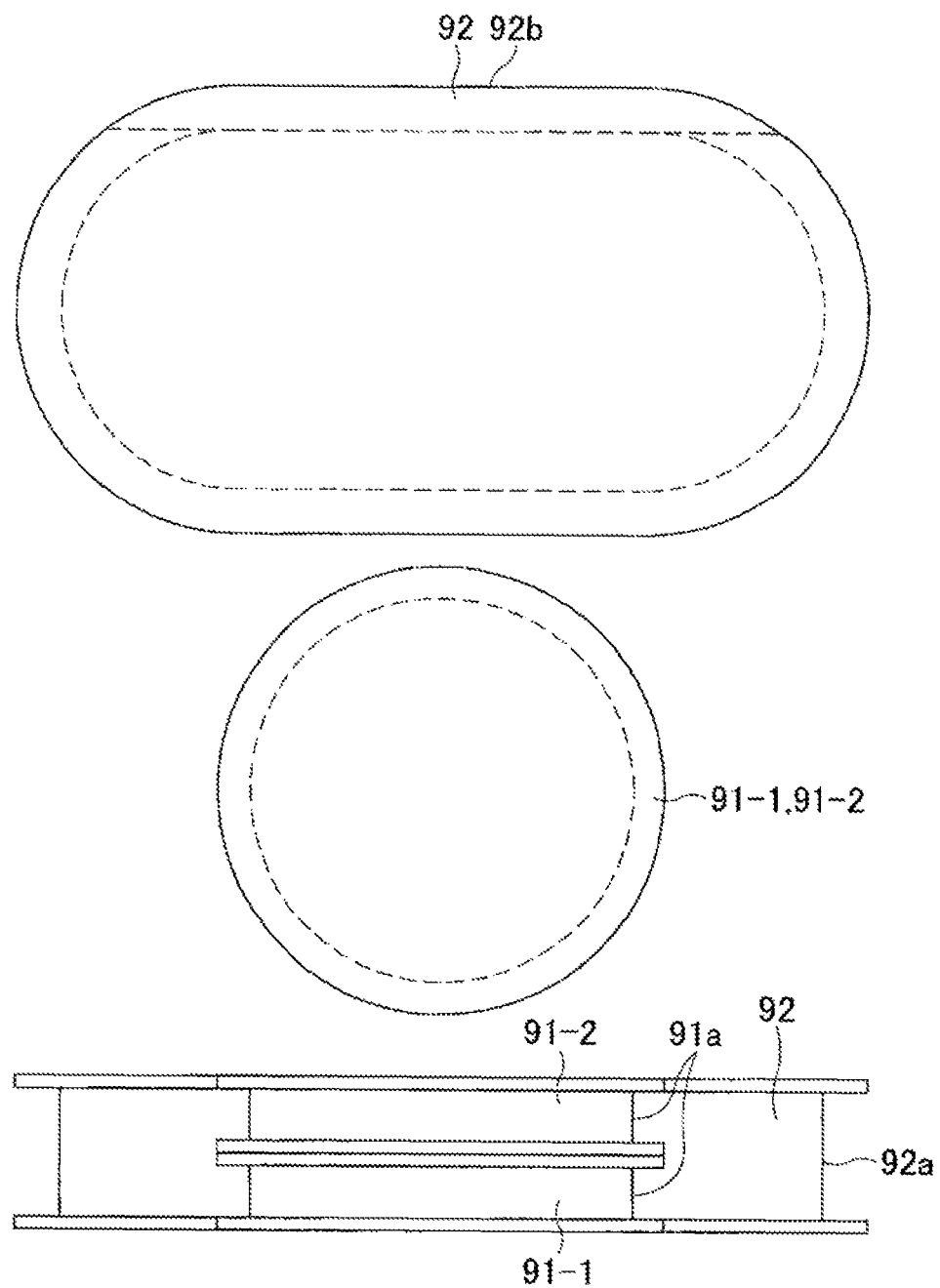
FIG. 10A illustrates a modification of an optical fiber holder suitable for connection of optical fibers using an optical adaptor.

FIG. 10A and FIG. 10B illustrate still another example of optical fiber holder. In this example, optical fibers are connected to each other using an optical adaptor, in place of splicing. FIG. 10A illustrates the positional relationship between the pair of first optical fiber guides 91-1 and 91-2 and the second optical fiber guide 92. As illustrated in the side view at the bottom of FIG. 10A, the thickness of the second optical fiber guide 92 is double the thickness of each of the first optical fiber guides 91-1 and 91-2. The first optical fiber guides 91-1 and 91-2 are stacked.

Each of the first optical fiber guides 91-1 and 91-2 has a fiber holding groove 91a for receiving optical fibers. The second optical fiber guide 92 has a fiber guide groove 92a for taking up at least a part of the optical fibers held by the first optical fiber guides 91-1 and 91-2.

As illustrated in FIG. 10B, the second optical fiber guide 92 is furnished with an optical adaptor 95, and optical connectors 92 are provided to the optical fibers 11-1 and 11-b, respectively. In place of using a protection sleeve to hold the spliced portion of the optical fibers, the second optical fiber guide 92 allows the optical fibers 11-1 and 11-2 to be joined to each other via the optical adaptor 95. In this example, a part of the surplus length stowing process up to the step of FIG. 5B may be performed manually, and the remaining process (FIG. 5C and the subsequent steps) may be automated.

There are many alterations and substitutions other than the foregoing examples. For example, instead of the oval shape, the second optical fiber guide 22 may be formed in a round shape. Because the splice between the optical fibers 11-1 and 11-2 is protected using a straight protection sleeve 14, the second optical fiber guide is shaped in an ellipse. If a sufficient level of splicing strength is guaranteed, the protection sleeve is unnecessary and therefore, the second optical fiber guide 22 may be formed round.

Only one the first optical fiber guides 21-1 and 21-2 may be furnished with guide holes 25. For example, the first optical fiber guide 21-1 is provided with the guide holes 25, and the other first optical fiber guide 21-2 is shaped in an annular reel so as to be engaged with the first optical fiber guide 21-1 at the circumference. The optical fiber guide 21-1 with the guide holes 25 is arranged at the bottom and the annular optical fiber guide 21-2 may be placed over the top of the optical fiber guide 21-1.

Instead of providing surplus length treating pins 28 on the tray 23, a first guide fixing pin 24 and a lock mechanism for locking the rotation of the first optical fiber guide 21 may be used. In this case, a guide hole 25 is formed at the center of the first optical fiber guide 21. After the first optical fiber guide 21 is moved around the second optical fiber guide 22 and secured by the fixing pin 24, the first optical fiber guide 21 is rotated around the fixing pin 24 to further take up the remaining surplus of the optical fibers. After the take-up of the surplus, the rotation of the first optical fiber guide 21 is locked by the lock mechanism.

Using the exemplified structures and processes described above, surplus lengths of optical fibers can be stowed collectively in good order, without introducing twist of fibers, while satisfying the condition of the minimum (allowable) bend radius of the optical fibers.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:

1. An optical fiber holder comprising:
   a pair of first optical fiber guides, each satisfying a condition of an allowable bend radius of an optical fiber;
   a second optical fiber guide configured to hold a joined portion of the optical fiber at a position between the first optical fiber guides, the second optical fiber guide satisfying the condition of the allowable bend radius of the optical fiber; and
   a tray configured to hold the first optical fiber guides and the second optical fiber guide, the tray having a fiber extraction opening for pulling the optical fiber onto the tray,
   wherein a distance from the fiber extraction opening to a fixing position of the second optical fiber guide on the tray is set smaller than a distance from the fiber extraction opening to a fixing position of the first optical fiber guides on the tray,
   wherein the tray has a first guide fixing member to secure the first optical fiber guides and a second guide fixing member to secure the second optical fiber guide, and
   wherein at least one of the pair of the first optical fiber guides has a first fitting member to fit with the first guide fixing member and the second optical fiber guide has a second fitting member to fit with the second guide fixing member.

2. The optical fiber holder according to claim 1, wherein the second optical fiber guide has a fiber retainer configured to hold the optical fiber, the fiber retainer having a straight portion to hold the joined portion of the optical fiber.

3. The optical fiber holder according to claim 1, wherein the first optical fiber guides are stacked on the tray and secured by the first guide fixing member.

4. The optical fiber holder according to claim 1, wherein the tray has surplus length treating pins to hold a surplus length of the optical fiber.

5. The optical fiber holder according to claim 4, wherein the surplus length treating pins are arranged to define one or more curved paths satisfying the allowable bend radius of the optical fiber.

6. The optical fiber holder according to claim 1, wherein the second optical fiber guide has an optical adaptor for connecting the optical fiber.

7. The optical fiber holder according to claim 1, wherein each of the first optical fiber guides has a fiber stopper structure to prevent the optical fiber from coming off.

8. The optical fiber holder according to claim 7, wherein the fiber stopper structure includes an optical fiber holding groove formed in the first optical fiber guide and a stopper piece to keep the optical fiber in the optical fiber holding groove.

9. The optical fiber holder according to claim 7, wherein the fiber stopper structure includes multiple projections made of an elastic material and arranged along a circumference of the first optical fiber guide.

10. The optical fiber holder according to claim 1, wherein the second optical fiber guide has a guide groove to take up at least a part of the optical fiber held between the first optical fiber guides.

11. The optical fiber holder according to claim 10, wherein fiber take-up directions around the second optical fiber guide along the guide groove using the first optical fiber guides are opposite to each other.

12. An optical device comprising:
    an optical fiber holder according to claim 1; and
    an optical circuit device including multiple optical components connected one another via the optical fiber.

13. A method of stowing a surplus length of an optical fiber, comprising:
    joining at least two optical fibers pulled out from an optical circuit device;
    holding the joined optical fibers between a pair of first optical fiber guides arranged with one of the first optical fiber guides on either side of the joint of the optical fibers, each of the first optical fiber guides satisfying an allowable bend radius of the optical fibers;
    holding the joint of the optical fibers with a second optical fiber guide that satisfies the allowable bend radius of the optical fiber;
    moving the second optical fiber guide straight toward a first fixing position on the optical circuit device, while holding the joint of the optical fibers with the second optical fiber guide, to secure the second optical fiber guide onto the optical circuit device at the first fixing position; and
    moving each of the first optical fiber guides, while holding the joined optical fibers between the first optical fiber guides, around the second optical fiber guide fixed at the first fixing position to take up the optical fibers and secure the first optical fiber guides onto the optical circuit device at a second fixing position.

14. The method according to claim 13, wherein a distance from an optical fiber extraction position for pulling out the optical fibers to the first fixing position is set smaller than a distance from the optical fiber extraction position to the second fixing position.

15. The method according to claim 13, wherein the first optical fiber guides are moved around the second optical fiber guide in directions opposite to each other.

16. The method according to claim 13, wherein the first optical fiber guides are stacked at the second fixing position on the optical circuit device.

* * * * *